US011815078B2

(12) United States Patent
Schubart et al.

(10) Patent No.: US 11,815,078 B2
(45) Date of Patent: *Nov. 14, 2023

(54) RECIPROCATING PISTON PUMP COMPRISING A HOUSING DEFINING A FIRST CHAMBER AND A SECOND CHAMBER COOPERATING WITH A FIRST PISTON AND A SECOND PISTON TO DEFINE A THIRD CHAMBER AND A FOURTH CHAMBER

(71) Applicant: Oshkosh Corporation, Oshkosh, WI (US)

(72) Inventors: Kai P. Schubart, Oshkosh, WI (US); Christopher J. Rukas, Oshkosh, WI (US); Patrick S. Dillman, Hartford, WI (US); Erik S. Ellifson, Oshkosh, WI (US); Aaron J. Rositch, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,182

(22) Filed: Oct. 6, 2022

(65) Prior Publication Data
US 2023/0046193 A1 Feb. 16, 2023

Related U.S. Application Data

(63) Continuation of application No. 16/575,590, filed on Sep. 19, 2019, now Pat. No. 11,480,165.

(51) Int. Cl.
*F04B 27/067* (2006.01)
*F04B 27/00* (2006.01)
*F15B 15/14* (2006.01)

(52) U.S. Cl.
CPC ...... *F04B 27/0673* (2013.01); *F15B 15/1447* (2013.01); *F04B 27/005* (2013.01)

(58) Field of Classification Search
CPC ............. B60G 17/0525; F04B 27/0673; F04B 27/005; F04B 27/02; F04B 27/053;
(Continued)

(56) References Cited

U.S. PATENT DOCUMENTS

| 116,572 A * | 7/1871 | Doyle | F04B 47/04 417/404 |
| 426,476 A * | 4/1890 | Stitt | F04B 47/04 417/404 |

(Continued)

OTHER PUBLICATIONS

U.S. Appl. No. 15/956,974, filed Apr. 19, 2018, Oshkosh Defense, LLC.
(Continued)

*Primary Examiner* — Kenneth J Hansen
*Assistant Examiner* — Benjamin Doyle
(74) *Attorney, Agent, or Firm* — Foley & Lardner LLP

(57) ABSTRACT

A pump system includes a housing defining a first internal volume and a second internal volume, a first piston positioned to separate the first internal volume into a first chamber and a second chamber, a second piston positioned to separate the second internal volume into a third chamber and a fourth chamber, a directional control valve (DCV) fluidly coupled to the second chamber and the fourth chamber, a first relief valve fluidly coupled to the DCV via a first control line and the second chamber via a first sensing line, a first orifice positioned along the first sensing line, a second relief valve fluidly coupled to the DCV via a second control line and the fourth chamber via a second sensing line, and a second orifice positioned along the second sensing line.

19 Claims, 20 Drawing Sheets

(58) Field of Classification Search
CPC ........ F04B 35/008; F04B 49/22; F04B 27/08;
F04B 9/113; F04B 9/115; F04B 5/02;
F04B 9/105; F15B 15/1447; F15B 3/00;
F15B 7/00; F15B 15/00; F01L 5/00;
F01L 15/00; F01L 2740/00; F01L 29/00;
F01L 21/00
USPC .................................................. 417/403, 404
See application file for complete search history.

(56) References Cited

U.S. PATENT DOCUMENTS

| | | | | |
|---|---|---|---|---|
| 764,156 | A * | 7/1904 | Spencer | F04B 47/04 417/403 |
| 1,573,584 | A * | 2/1926 | Smith | F04B 47/04 417/264 |
| 1,674,614 | A * | 6/1928 | Berkman | F04B 9/125 184/29 |
| 3,207,442 | A * | 9/1965 | Kessler | B08B 3/028 222/335 |
| 3,215,339 | A * | 11/1965 | Jackson | B60G 15/12 417/404 |
| 3,249,289 | A * | 5/1966 | Maglott | F04B 35/008 417/397 |
| 3,374,863 | A * | 3/1968 | Kozlowski | B02C 17/181 184/29 |
| 3,540,349 | A * | 11/1970 | Joseph | F01B 11/001 91/309 |
| 3,700,360 | A * | 10/1972 | Shaddock | F04B 53/164 91/275 |
| 3,722,366 | A * | 3/1973 | Richardson | B30B 15/20 91/170 R |
| 3,771,421 | A * | 11/1973 | Scheffer | F04B 9/125 91/313 |
| 3,838,710 | A * | 10/1974 | Reip | F16K 31/124 91/461 |
| 4,029,440 | A * | 6/1977 | Olsen | H01F 38/02 91/305 |
| 4,062,639 | A * | 12/1977 | Conlee | F01L 25/063 91/308 |
| 4,220,074 | A * | 9/1980 | Reip | F15B 13/043 137/625.68 |
| 4,347,049 | A * | 8/1982 | Anderson | F04B 47/04 417/403 |
| 4,367,140 | A * | 1/1983 | Wilson | B01D 61/06 137/599.08 |
| 4,368,008 | A * | 1/1983 | Budzich | F04B 25/02 417/267 |
| 4,373,865 | A * | 2/1983 | Budzich | F04B 9/115 417/403 |
| 4,383,804 | A * | 5/1983 | Budzich | F04B 39/0005 417/267 |
| 4,386,888 | A * | 6/1983 | Verley | F01L 25/063 417/393 |
| 4,469,315 | A | 9/1984 | Nicholls et al. | |
| 4,490,096 | A * | 12/1984 | Box | F04B 15/02 417/342 |
| 4,515,516 | A * | 5/1985 | Perrine | F17C 5/06 222/61 |
| 4,524,582 | A * | 6/1985 | Lucas | B30B 15/16 91/20 |
| 4,653,986 | A * | 3/1987 | Ashton | F04B 9/113 417/268 |
| 4,666,374 | A * | 5/1987 | Nelson | F04B 11/0058 417/345 |
| 5,013,198 | A * | 5/1991 | Schultz | F04B 23/06 417/403 |
| 5,042,149 | A * | 8/1991 | Holland | F04B 47/08 29/469 |
| 5,092,744 | A * | 3/1992 | Boers | F04B 9/105 91/275 |
| 5,145,332 | A * | 9/1992 | Bohon | F04B 47/04 417/403 |
| 5,249,502 | A * | 10/1993 | Radocaj | F15B 15/1409 91/422 |
| 5,249,933 | A * | 10/1993 | Moody | F04B 7/0076 114/319 |
| 5,324,175 | A * | 6/1994 | Sorensen | F04B 9/1295 417/397 |
| 5,337,561 | A * | 8/1994 | Raghavan | F15B 3/00 60/426 |
| 5,415,531 | A * | 5/1995 | Cavanaugh | F04B 9/133 417/403 |
| 5,462,414 | A * | 10/1995 | Permar | F04B 9/115 417/313 |
| 5,564,912 | A * | 10/1996 | Peck | F04D 13/04 417/396 |
| 5,616,005 | A * | 4/1997 | Whitehead | F04F 1/10 417/393 |
| 5,639,119 | A * | 6/1997 | Plate | B62D 49/08 280/124.112 |
| 5,941,508 | A | 8/1999 | Murata et al. | |
| 6,129,368 | A * | 10/2000 | Ishikawa | F16F 9/064 280/124.16 |
| 6,135,724 | A * | 10/2000 | Yoder | F04B 13/00 222/63 |
| 6,203,696 | B1 * | 3/2001 | Pearson | B01D 61/06 417/399 |
| 6,231,322 | B1 * | 5/2001 | Adolfsson | B67D 1/004 261/35 |
| 6,266,959 | B1 | 7/2001 | Markwart | |
| 6,299,766 | B1 * | 10/2001 | Permar | B01D 61/026 417/313 |
| 6,418,970 | B1 | 7/2002 | Deul | |
| 6,435,843 | B1 * | 8/2002 | Hur | F04B 9/113 417/399 |
| 6,478,552 | B1 * | 11/2002 | Batten | F04B 9/135 417/403 |
| 6,491,813 | B2 * | 12/2002 | Verde | F04B 9/115 417/313 |
| 6,568,911 | B1 * | 5/2003 | Brightwell | F04B 35/008 417/53 |
| 6,761,027 | B2 * | 7/2004 | A'Hearn | E02F 9/2225 60/420 |
| 7,175,395 | B1 * | 2/2007 | Forest | F04B 9/115 417/393 |
| 7,316,363 | B2 | 1/2008 | Hume et al. | |
| 7,527,483 | B1 * | 5/2009 | Glauber | F04B 43/0736 417/267 |
| 8,037,678 | B2 * | 10/2011 | McBride | F15B 1/024 60/412 |
| 8,323,003 | B2 * | 12/2012 | Judge | F04B 9/1376 417/404 |
| 8,333,390 | B2 | 12/2012 | Linsmeier et al. | |
| 8,376,719 | B2 | 2/2013 | Grady et al. | |
| 8,465,025 | B2 | 6/2013 | Venton-Walters et al. | |
| 8,596,648 | B2 | 12/2013 | Venton-Walters et al. | |
| 8,764,029 | B2 | 7/2014 | Venton-Walters et al. | |
| 8,801,017 | B2 | 8/2014 | Ellifson et al. | |
| 8,801,393 | B2 | 8/2014 | Crabtree et al. | |
| 8,821,130 | B2 | 9/2014 | Venton-Walters et al. | |
| 8,876,133 | B2 | 11/2014 | Ellifson | |
| 8,991,834 | B2 | 3/2015 | Venton-Walters et al. | |
| 9,127,657 | B2 * | 9/2015 | Glauber | F04B 9/131 |
| 9,127,738 | B2 | 9/2015 | Ellifson et al. | |
| 9,174,686 | B1 | 11/2015 | Messina et al. | |
| 9,291,230 | B2 | 3/2016 | Ellifson et al. | |
| 9,303,715 | B2 | 4/2016 | Dillman et al. | |
| 9,327,576 | B2 | 5/2016 | Ellifson | |
| 9,440,829 | B2 | 9/2016 | Sadiq | |
| 9,581,153 | B2 | 2/2017 | Venton-Walters et al. | |
| 9,688,112 | B2 | 6/2017 | Venton-Walters et al. | |
| 9,707,869 | B1 | 7/2017 | Messina et al. | |
| 9,765,841 | B2 | 9/2017 | Ellifson et al. | |
| 9,809,080 | B2 | 11/2017 | Ellifson et al. | |
| 9,890,771 | B2 * | 2/2018 | Jiang | F04B 53/10 |
| 9,944,145 | B2 | 4/2018 | Dillman et al. | |
| 10,030,737 | B2 | 7/2018 | Dillman et al. | |
| 10,350,956 | B2 | 7/2019 | Dillman et al. | |
| 10,369,860 | B2 | 8/2019 | Ellifson et al. | |

(56) References Cited

U.S. PATENT DOCUMENTS

| | | | |
|---|---|---|---|
| 10,408,196 B2* | 9/2019 | Huang | F04B 49/06 |
| 10,421,332 B2 | 9/2019 | Venton-Walters et al. | |
| 10,422,403 B2 | 9/2019 | Ellifson et al. | |
| 10,584,699 B2* | 3/2020 | Huang | F04B 5/02 |
| 10,920,587 B2* | 2/2021 | Yuratich | E21B 49/10 |
| 2003/0118459 A1* | 6/2003 | Gerhardt | F04B 49/065 |
| | | | 417/390 |
| 2007/0045067 A1* | 3/2007 | Schedgick | B60G 99/002 |
| | | | 188/266 |
| 2008/0008025 A1* | 1/2008 | Abe | B28C 5/422 |
| | | | 366/61 |
| 2009/0077957 A1* | 3/2009 | Noble | F15B 15/204 |
| | | | 417/404 |
| 2011/0192157 A1* | 8/2011 | Ogawa | F15B 21/14 |
| | | | 60/473 |
| 2011/0225961 A1* | 9/2011 | McCrary | F15B 21/12 |
| | | | 60/415 |
| 2013/0249175 A1* | 9/2013 | Ellifson | F16F 9/096 |
| | | | 188/314 |
| 2013/0287615 A1* | 10/2013 | Fong | F04B 3/00 |
| | | | 417/523 |
| 2014/0378253 A1* | 12/2014 | Tanaka | F16H 7/1236 |
| | | | 474/110 |
| 2015/0008420 A1 | 1/2015 | Mazhari et al. | |
| 2015/0128584 A1* | 5/2015 | Zaleski | F02N 9/04 |
| | | | 60/459 |
| 2015/0308420 A1* | 10/2015 | Donnally | F04B 5/02 |
| | | | 417/404 |
| 2015/0361970 A1* | 12/2015 | White | F04B 53/143 |
| | | | 417/320 |
| 2016/0257390 A1* | 9/2016 | Tsutsui | C23F 13/06 |
| 2018/0149145 A1* | 5/2018 | Sato | F04B 9/113 |
| 2018/0335104 A1 | 11/2018 | Dillman et al. | |
| 2019/0154023 A1* | 5/2019 | Oroojloo | F04B 39/08 |
| 2019/0178329 A1 | 6/2019 | Dumitru et al. | |
| 2019/0185077 A1 | 6/2019 | Smith et al. | |
| 2019/0262646 A1 | 8/2019 | Linsmeier et al. | |
| 2019/0308480 A1 | 10/2019 | Dillman et al. | |
| 2019/0316650 A1 | 10/2019 | Dillman et al. | |
| 2019/0337348 A1 | 11/2019 | Venton-Walters et al. | |
| 2019/0337350 A1 | 11/2019 | Ellifson et al. | |
| 2019/0338823 A1 | 11/2019 | Ellifson et al. | |
| 2020/0040882 A1* | 2/2020 | Kalmari | F04B 53/18 |
| 2021/0088036 A1 | 3/2021 | Schubart et al. | |

OTHER PUBLICATIONS

U.S. Appl. No. 15/956,992, filed Apr. 19, 2018, Oshkosh Defense, LLC.

* cited by examiner

RECIPROCATING PISTON PUMP COMPRISING A HOUSING DEFINING A FIRST CHAMBER AND A SECOND CHAMBER COOPERATING WITH A FIRST PISTON AND A SECOND PISTON TO DEFINE A THIRD CHAMBER AND A FOURTH CHAMBER

CROSS-REFERENCE TO RELATED PATENT APPLICATION

This application is a continuation of U.S. patent application Ser. No. 16/575,590, filed Sep. 19, 2019, which is incorporated herein by reference in its entirety.

BACKGROUND

The present disclosure relates generally to pumps and compressors. More specifically, the present disclosure relates to a pump for conveying compressed gas throughout a vehicle.

Gas springs are used within vehicle suspension systems to connect a wheel-end assembly to a chassis of the vehicle. A length of each gas spring is controlled by a volume of pressurized gas contained within the gas spring. When a wheel encounters an obstruction (e.g., a bump, a pothole, etc.), the gas compresses or expands to permit the wheel to maintain contact with the ground while minimizing movement of the chassis. Some vehicles include pumps that vary the amount of gas within the gas spring to vary a ride height of the vehicle. It is desirable for such pumps to have as high of a flow rate as possible to facilitate rapid adjustment of ride height.

SUMMARY

At least one embodiment relates to a pump system. The pump system includes a housing, a first piston, a second piston, a first inlet check valve, a second inlet check valve, a directional control valve (DCV), and a relief valve. The housing defines a first internal volume and a second internal volume. The first piston is positioned to separate the first internal volume into a first chamber and a second chamber. The second piston is positioned to separate the second internal volume into a third chamber and a fourth chamber. The second piston is coupled to the first piston. The first inlet check valve is configured to be at least selectively fluidly coupled to a reservoir. The first inlet check valve is positioned to permit a first fluid received from the reservoir to enter the first chamber. The second inlet check valve is configured to be at least selectively fluidly coupled to the reservoir. The second inlet check valve is positioned to permit the first fluid received from the reservoir to enter the third chamber. The DCV is fluidly coupled to the second chamber and the fourth chamber. The DCV is configured to alternately supply a second fluid to the second chamber and the fourth chamber such that the first fluid is forced out of one of the first chamber or the third chamber. The DCV is repositionable between (a) a first position where the DCV is configured to fluidly couple the second chamber to a high pressure fluid source and (b) a second position where the DCV is configured to fluidly couple the fourth chamber to the high pressure fluid source. The relief valve is fluidly coupled to the second chamber through a sensing line. The relief valve is configured to supply the second fluid to the DCV in response to a pressure within the sensing line exceeding a shift pressure to move the DCV from the first position to the second position.

Another embodiment relates to a pump system. The pump system includes a housing, a first piston, a second piston, a directional control valve (DCV), and a relief valve. The housing defines a first internal volume and a second internal volume. The first piston is positioned to separate the first internal volume into a first chamber and a second chamber. The second piston is positioned to separate the second internal volume into a third chamber and a fourth chamber. The first chamber and the third chamber are configured to selectively receive a first fluid from a first fluid source. The second chamber and the fourth chamber are configured to selectively receive a second fluid from a second fluid source. The DCV is fluidly coupled to the second chamber and the fourth chamber. The DCV is repositionable between (a) a first position where the DCV is configured to fluidly couple the second chamber to the second fluid source and (b) a second position where the DCV is configured to fluidly couple the fourth chamber to the second fluid source. The relief valve is fluidly coupled to the second chamber through a sensing line. The relief valve is configured to supply the second fluid to the DCV in response to a pressure within the sensing line exceeding a shift pressure to move the DCV from the first position to the second position.

Another embodiment relates to a pump system. The pump system includes a housing defining a first internal volume and a second internal volume, a first piston positioned to separate the first internal volume into a first chamber and a second chamber, a second piston positioned to separate the second internal volume into a third chamber and a fourth chamber, a directional control valve (DCV) fluidly coupled to the second chamber and the fourth chamber, a first relief valve fluidly coupled to the DCV via a first control line and the second chamber via a first sensing line, a first orifice positioned along the first sensing line, a second relief valve fluidly coupled to the DCV via a second control line and the fourth chamber via a second sensing line, and a second orifice positioned along the second sensing line.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a pump system includes a pump and a pump controller. Specifically, the pump is a reciprocating piston pump including two pistons that are coupled by a rod to form a piston assembly. The first piston divides a first volume of a housing into a first outer chamber and a first inner chamber. The second piston divides a second volume of the housing into a second outer chamber and a second inner chamber. Each outer chamber is fluidly coupled to an inlet check valve and an outlet check valve. Accordingly, as the piston assembly reciprocates, a first fluid (e.g., nitrogen) is drawn into one outer chamber through the corresponding inlet check valve and expelled from the other outer chamber through the corresponding outlet check valve, with the direction of flow for each chamber being based on a movement direction of the piston assembly.

The pump controller provides a second fluid (e.g., hydraulic oil) alternately to each inner chamber to cause the piston assembly to reciprocate. In one embodiment, the pump controller includes a two-position directional control valve that controls which inner chamber is being supplied with the second fluid. A pair of relief valves change the position of the directional control valve in response to a pressure within one of the inner chambers exceeding a shift pressure. A pair of orifices are positioned to delay the flow of fluid through the relief valve, which in turn delays the shifting of the position of the directional control valve. This permits the pressure supplied to the inner chambers to increase above the shift pressure, beneficially increasing the maximum output pressure of the pump relative to an identical pump without the orifices. Additionally, in some arrangements, the first fluid is pressurized prior to entering the outer chambers. Due to the positions of the outer chambers relative to the piston assembly, this further increases the maximum output pressure of the pump.

Pump Assembly

Figure 1:
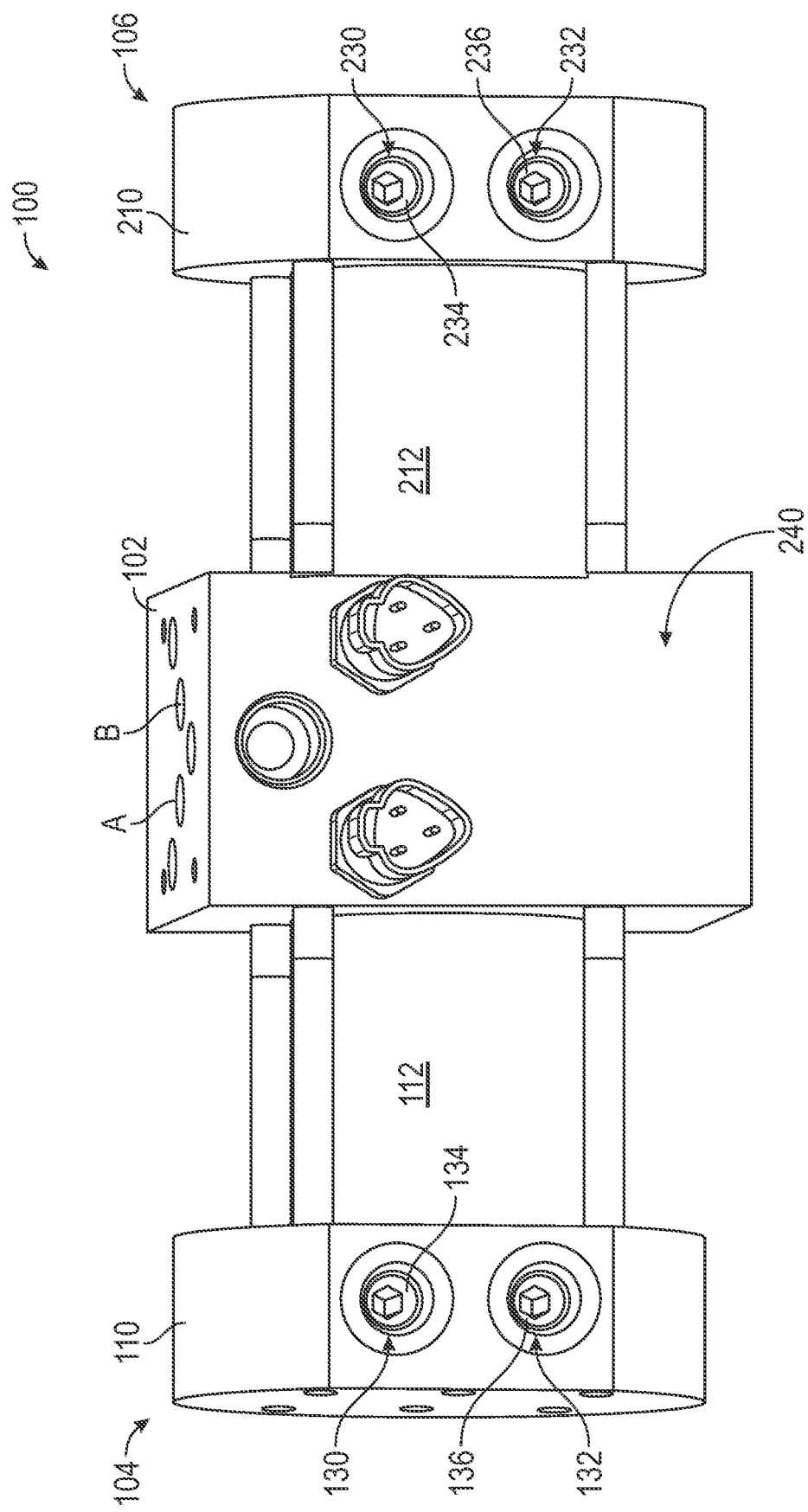
FIG. 1 is a front perspective view of a pump, according to an exemplary embodiment.

Referring to FIG. 1, a fluid conveyor (e.g., a high-pressure gas (HPG) piston pump, a pump assembly, a compressor assembly, etc.) is shown as pump 100 according to an exemplary embodiment. The pump 100 is configured to intake a fluid (e.g., gas, liquid, etc.) and expel the fluid at a higher pressure. In some embodiments, the pump 100 is configured to increase the pressure of an inert gas (e.g., nitrogen, argon, etc.).

Figure 2:
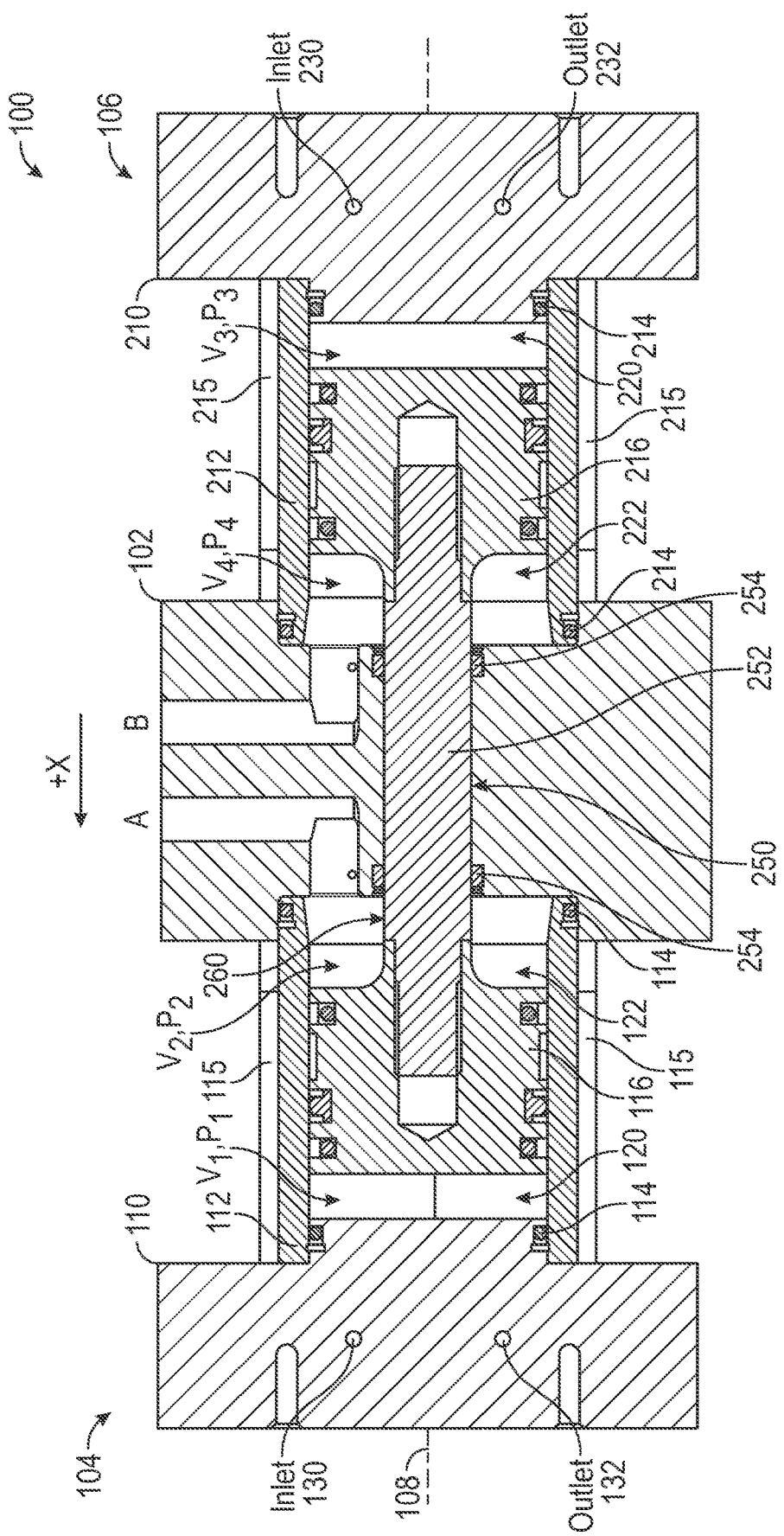
FIG. 2 is a front section view of the pump of FIG. 1 with a piston assembly in a center position.

As shown in FIGS. 1 and 2, the pump 100 includes a central portion or divider, shown as main body 102, coupled to a pair of piston assemblies, shown as end assemblies 104 and 106. The end assemblies 104 and 106 may be substantially similar to one another, except as otherwise specified herein. The main body 102 is substantially centered between the end assembly 104 and the end assembly 106. The main body 102, the end assembly 104, and the end assembly 106 are substantially centered about a longitudinal axis, shown as actuation axis 108.

The end assembly 104 includes an end portion, shown as cap 110, oriented substantially perpendicular to the actuation axis 108. Extending between the main body 102 and the cap 110 is a tubular member (e.g., a piston bore sleeve), shown as piston tube 112. A pair of annular seals, shown as o-rings 114, extend between the cap 110 and the piston tube 112 and between the piston tube 112 and the main body 102, respectively. The o-rings 114 substantially seal the connections between the cap 110, the piston tube 112, and the main body 102, such that a first sealed volume is formed between the cap 110, the piston tube 112, and the main body 102. A series of threaded rods 115 extend longitudinally between and engage the cap 110 and the main body 102, coupling the cap 110 to the main body 102. In one embodiment, the threaded rods 115 are arranged outside of the piston tube 112. The piston tube 112 is captured between the cap 110 and the main body 102. In some embodiments, the piston tube 112 is located relative to the cap 110 and the main body 102 by engagement with a shoulder or a protrusion of the cap 110 and/or the main body 102.

A first piston or cylindrical member, shown as piston 116, is positioned within the first sealed volume of the end assembly 104. The piston 116 sealingly engages an inner surface of the piston tube 112, dividing the first sealed volume into a first chamber or volume, shown as outer chamber 120, and a second chamber or volume, shown as inner chamber 122. The piston 116 is substantially centered about the actuation axis 108. The piston 116 is slidably coupled to the piston tube 112 such that the piston 116 can translate along the actuation axis 108 to vary the volumes of the outer chamber 120 and the inner chamber 122.

Figure 3:
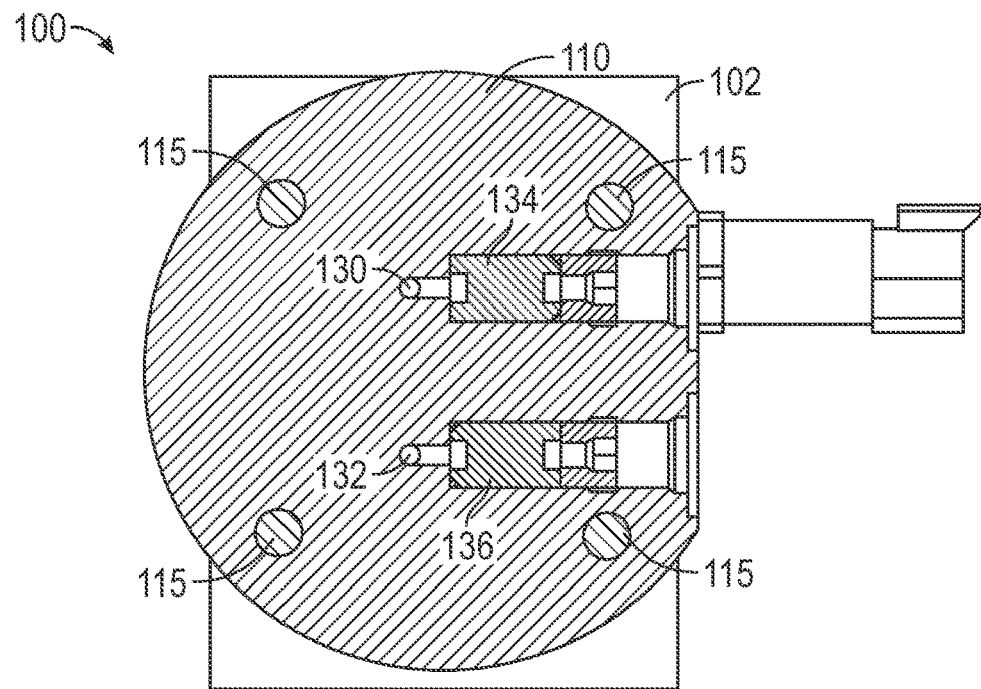
FIG. 3 is a left section view of the pump of FIG. 1.
Figure 4:
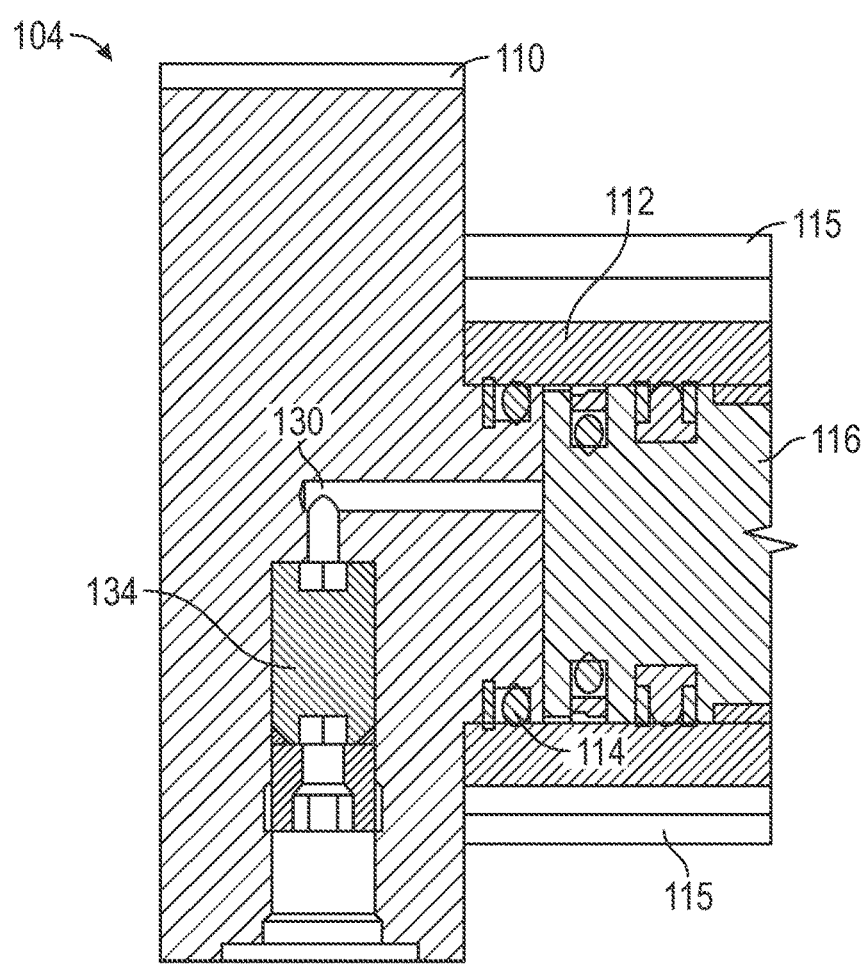
FIG. 4 is a top section view of the pump of FIG. 1 with the piston assembly in an extreme left position.

Referring to FIGS. 2-4, the cap 110 defines a first passage, shown as inlet passage 130, and a second passage, shown as outlet passage 132, extending therethrough. The inlet passage 130 and the outlet passage 132 are fluidly coupled to the outer chamber 120. A first directionally-dependent flow control device or check valve assembly, shown as inlet check valve 134, is coupled to the cap 110 and positioned along the inlet passage 130. The inlet check valve 134 is configured to permit flow (e.g., minimally obstructed flow) of fluid through the inlet passage 130 and into the outer chamber 120. The inlet check valve 134 is configured to limit (e.g., prevent) flow of fluid through the inlet passage 130 and out of the outer chamber 120. A second directionally-dependent flow control device or check valve assembly, shown as outlet check valve 136, is coupled to the cap 110 and positioned along the outlet passage 132. The outlet check valve 136 is configured to permit flow (e.g., minimally obstructed flow) of fluid through the outlet passage 132 and out of the outer chamber 120. The outlet check valve 136 is configured to limit (e.g., prevent) flow of fluid through the outlet passage 132 and into the outer chamber 120.

A third passage, shown as passage A, is defined by the main body 102 and extends therethrough. The passage A is fluidly coupled to the inner chamber 122. A portion of the inlet passage 130 and a portion of the outlet passage 132 adjacent the outer chamber 120 extend substantially parallel to the actuation axis 108. A portion of the passage A adjacent the inner chamber 122 extends substantially parallel to the actuation axis 108.

The end assembly 106 includes an end portion, shown as cap 210, oriented substantially perpendicular to the actuation axis 108. Extending between the main body 102 and the cap 210 is a tubular member (e.g., a piston bore sleeve), shown as piston tube 212. A pair of annular seals, shown as o-rings 214, extend between the cap 210 and the piston tube 212 and between the piston tube 212 and the main body 102, respectively. The o-rings 214 substantially seal the connections between the cap 210, the piston tube 212, and the main body 102, such that a second sealed volume is formed between the cap 210, the piston tube 212, and the main body 102. A series of threaded rods 215 extend longitudinally between and engage the cap 210 and the main body 102, coupling the cap 210 to the main body 102. In one embodiment, the threaded rods 215 are arranged outside of the piston tube 212. The piston tube 212 is captured between the cap 210 and the main body 102. In some embodiments, the piston tube 212 is located relative to the cap 210 and the main body 102 by engagement with a shoulder or a protrusion of the cap 210 and/or the main body 102.

A second piston or cylindrical member, shown as piston 216, is positioned within the second sealed volume of the end assembly 106. The piston 216 sealingly engages an inner surface of the piston tube 212, dividing the second sealed volume into a third chamber or volume, shown as outer chamber 220, and a fourth chamber or volume, shown as inner chamber 222. The inner chamber 122 is separated from the inner chamber 222 by the main body 102. The piston 216 is substantially centered about the actuation axis 108. The piston 216 is slidably coupled to the piston tube 212 such that the piston 216 can translate along the actuation axis 108 to vary the volumes of the outer chamber 220 and the inner chamber 222.

The cap 210 defines a first passage, shown as inlet passage 230, and a second passage, shown as outlet passage 232, extending therethrough. The inlet passage 230 and the outlet passage 232 are fluidly coupled to the outer chamber 220. A first directionally-dependent flow control device or check valve assembly, shown as inlet check valve 234, is coupled to the cap 210 and positioned along the inlet passage 230. The inlet check valve 234 is configured to permit flow (e.g., minimally obstructed flow) of fluid through the inlet passage 230 and into the outer chamber 220. The inlet check valve 234 is configured to limit (e.g., prevent) flow of fluid through the inlet passage 230 and out of the outer chamber 220. A second directionally-dependent flow control device or check valve assembly, shown as outlet check valve 236, is coupled to the cap 210 and positioned along the outlet passage 232. The outlet check valve 236 is configured to permit flow (e.g., minimally obstructed flow) of fluid through the outlet passage 232 and out of the outer chamber 220. The outlet check valve 236 is configured to limit (e.g., prevent) flow of fluid through the outlet passage 232 and into the outer chamber 220.

A third passage, shown as passage B, is defined by the main body 102 and extends therethrough. The passage B is fluidly coupled to the inner chamber 222. A portion of the inlet passage 230 and a portion of the outlet passage 232 adjacent the outer chamber 220 extend substantially parallel to the actuation axis 108. A portion of the passage B adjacent the inner chamber 222 extends substantially parallel to the actuation axis 108.

The cap 110, the piston tube 112, the main body 102, the piston tube 212, and the cap 210 are part of a housing 240. The housing 240 defines the first sealed volume and the second sealed volume that are divided into the outer chamber 120, the inner chamber 122, the outer chamber 220, and the inner chamber 222 by the piston 116, the piston 216, and the main body 102.

An aperture, shown as piston rod aperture 250, extends longitudinally through the main body 102 between the inner chamber 122 and the inner chamber 222. Specifically, the piston rod aperture 250 is substantially centered about the actuation axis 108. A shaft, rod, or coupler, shown as piston rod 252, extends through the piston rod aperture 250. A first end of the piston rod 252 is coupled (e.g., fixedly, through a threaded engagement, etc.) to the piston 116. A second, opposite end of the piston rod 252 is coupled (e.g., fixedly, through a threaded engagement, etc.) to the piston 216. A pair of annular seals, shown as o-rings 254, are coupled to the main body 102 along an inner surface of the piston rod aperture 250. The o-rings 254 engage the piston rod 252 and the main body 102, each creating a seal that fluidly decouples the inner chamber 122 from the inner chamber 222.

The piston rod 252 fixedly couples the piston 116 to the piston 216 to form a piston assembly 260 (i.e., the piston assembly 260 includes the piston 116, the piston 216, and the piston rod 252). Accordingly, the movement of each piston 116, 216 along the actuation axis 108 is equal (i.e., in the same direction and the same distance). By way of example, when the piston 116 moves 0.25 inches to the left, the piston 216 also moves 0.25 inches to the left. By way of another example, when the piston 216 moves 1 inch to the right, the piston 116 also moves 1 inch to the right.

Figure 6:
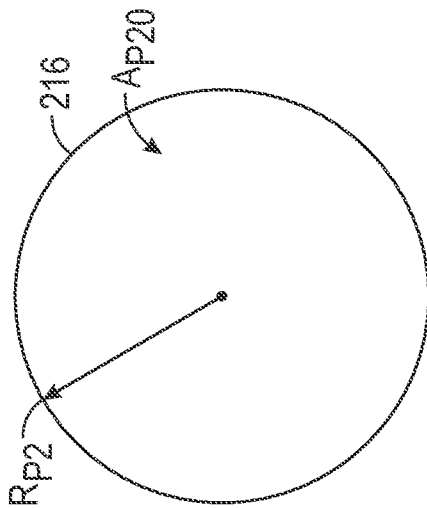
FIG. 6 is a right side view of a second piston of the piston assembly of FIG. 4.
Figure 5:
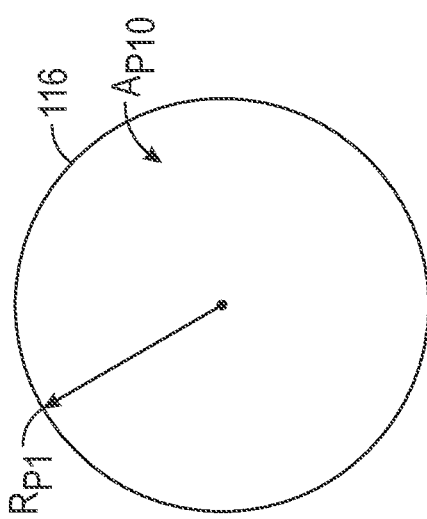
FIG. 5 is a left side view of a first piston of the piston assembly of FIG. 4.

Referring to FIGS. 5 and 6, front views of the piston 116 and the piston 216 are shown. In this embodiment, the piston 116 is substantially cylindrical and has a constant outer radius $R_{P1}$ along the actuation axis 108. The area $A_{P1O}$ of the outer surface of the piston 116 (i.e., the surface of the piston 116 that is exposed to the outer chamber 120) can be calculated using the following equation:

$$A_{P1O} = \pi R_{P1}^2 \qquad (1)$$

Similarly, the piston 216 is substantially cylindrical and has a constant outer radius $R_{P2}$ along the actuation axis 108. The area $A_{P2O}$ of the outer surface of the piston 216 (i.e., the surface of the piston 216 that is exposed to the outer chamber 220) can be calculated using the following equation:

$$A_{P2O} = \pi R_{P2}^2 \qquad (2)$$

Figure 8:
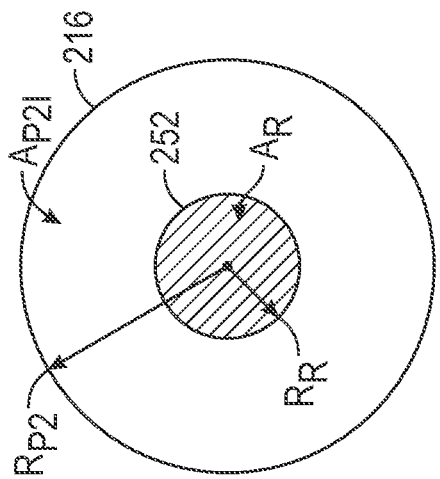
FIG. 8 is a left section view of the second piston of FIG. 6.
Figure 7:
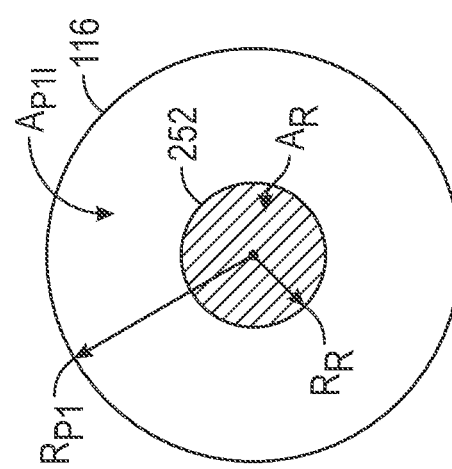
FIG. 7 is a right section view of the first piston of FIG. 5.

Referring to FIGS. 7 and 8, rear views of the piston 116 and the piston 216 are shown. In this embodiment, the piston rod 252 is substantially cylindrical and has a constant outer radius $R_R$ along the actuation axis 108. The piston rod 252 has a cross-sectional area $A_R$ where the piston rod 252 meets the piston 116 and the piston 216. An area $A_{P1I}$ of the inner surface of the piston 116 (i.e., the surface of the piston 116 that is exposed to the inner chamber 122) and an area $A_{P2I}$ of the inner surface of the piston 216 (i.e., the surface of the piston 216 that is exposed to the inner chamber 222) can be calculated as follows:

$$A_{P1I} = A_{P1O} - A_R = \pi R_{P1}^2 - \pi R_R^2 \quad (3)$$

$$A_{P2I} = A_{P2O} - A_R = \pi R_{P2}^2 - \pi R_R^2 \quad (4)$$

The areas of the inner surfaces are smaller than the areas of the corresponding outer surfaces due to the presence of the piston rod 252 on the inner surfaces.

Referring to FIG. 2, as the piston assembly 260 travels along the actuation axis 108, the volumes of each inner volume and outer volume vary. By way of example, when the piston 116 travels in a first direction (e.g., to the left as shown in FIG. 2), the outer chamber 120 decreases in volume and the inner chamber 122 increases in volume. Due to the coupling of the piston 116 and the piston 216 by the piston rod 252, the piston 216 also travels in the first direction such that the outer chamber 220 increases in volume and the inner chamber 222 decreases in volume. By way of another example, when the piston 116 travels in a second direction (e.g., to the right as shown in FIG. 2), the outer chamber 120 increases in volume and the inner chamber 122 decreases in volume. Due to the coupling of the piston 116 and the piston 216, the piston 216 also travels in the second direction such that the outer chamber 220 decreases in volume and the inner chamber 222 increases in volume.

The position of the piston assembly 260 along the actuation axis 108 is referred to herein as position X, where X=0 when the piston assembly 260 is centered within the pump 100 and where X increases when the piston assembly 260 moves to the left as shown in FIG. 2. The outer chamber 120, the inner chamber 122, the outer chamber 220, and the inner chamber 222 have a volume $V_1$, a volume $V_2$, a volume $V_3$, and a volume $V_4$, respectively. These volumes depend upon the areas of each corresponding piston surface and the position X of the piston assembly 260. Accordingly, the rate of change of each volume (e.g., $V_1$, etc.) may be calculated as follows:

$$\dot{V}_1 = -A_{P1O} \times \dot{X} \quad (5)$$

$$\dot{V}_2 = A_{P1I} \times \dot{X} \quad (6)$$

$$\dot{V}_3 = A_{P2O} \times \dot{X} \quad (7)$$

$$\dot{V}_4 = -A_{P2I} \times \dot{X} \quad (8)$$

where $\dot{X}$ is the rate of change of the position X. Because each inner volume and corresponding outer volume are positioned on opposite sides of the corresponding piston, the corresponding rates of change (e.g., the rate of change of the volume $V_1$ and the volume $V_2$) have opposite signs (i.e., when one increases, the other decreases).

The fluid within each chamber has a corresponding pressure. Specifically, the fluids within the outer chamber 120, the inner chamber 122, the outer chamber 220, and the inner chamber 222 have corresponding pressures $P_1$, $P_2$, $P_3$, and $P_4$, respectively. The forces on the piston assembly 260 are dependent on the pressures within the chambers and the corresponding exposed areas of the pistons. Specifically, the sum of the forces on the piston assembly 260 along the actuation axis 108 (i.e., $\Sigma F_x$) can be calculated as follows:

$$\Sigma F_X = -A_{P1O} P_1 + A_{P1I} P_2 + A_{P2O} P_3 - A_{P2I} P_4 = M a_x \quad (9)$$

where M is the mass of the piston assembly 260 and $a_x$ is the acceleration of the piston assembly 260 in the positive X direction.

The piston assembly 260 may driven to reciprocate (e.g., by selectively applying pressurized fluid to different chambers). In some embodiments, due to this reciprocation, the pump 100 is configured to draw in fluid at a low pressure (e.g., atmospheric pressure, above atmospheric pressure, below atmospheric pressure) through the inlet passage 130 and the inlet passage 230 (e.g., from the same fluid source, from different fluid sources, etc.) and expel the fluid at a higher pressure through the outlet passage 132 and the outlet passage 232 (e.g., to the same chamber, to different chambers, etc.).

Figure 9:
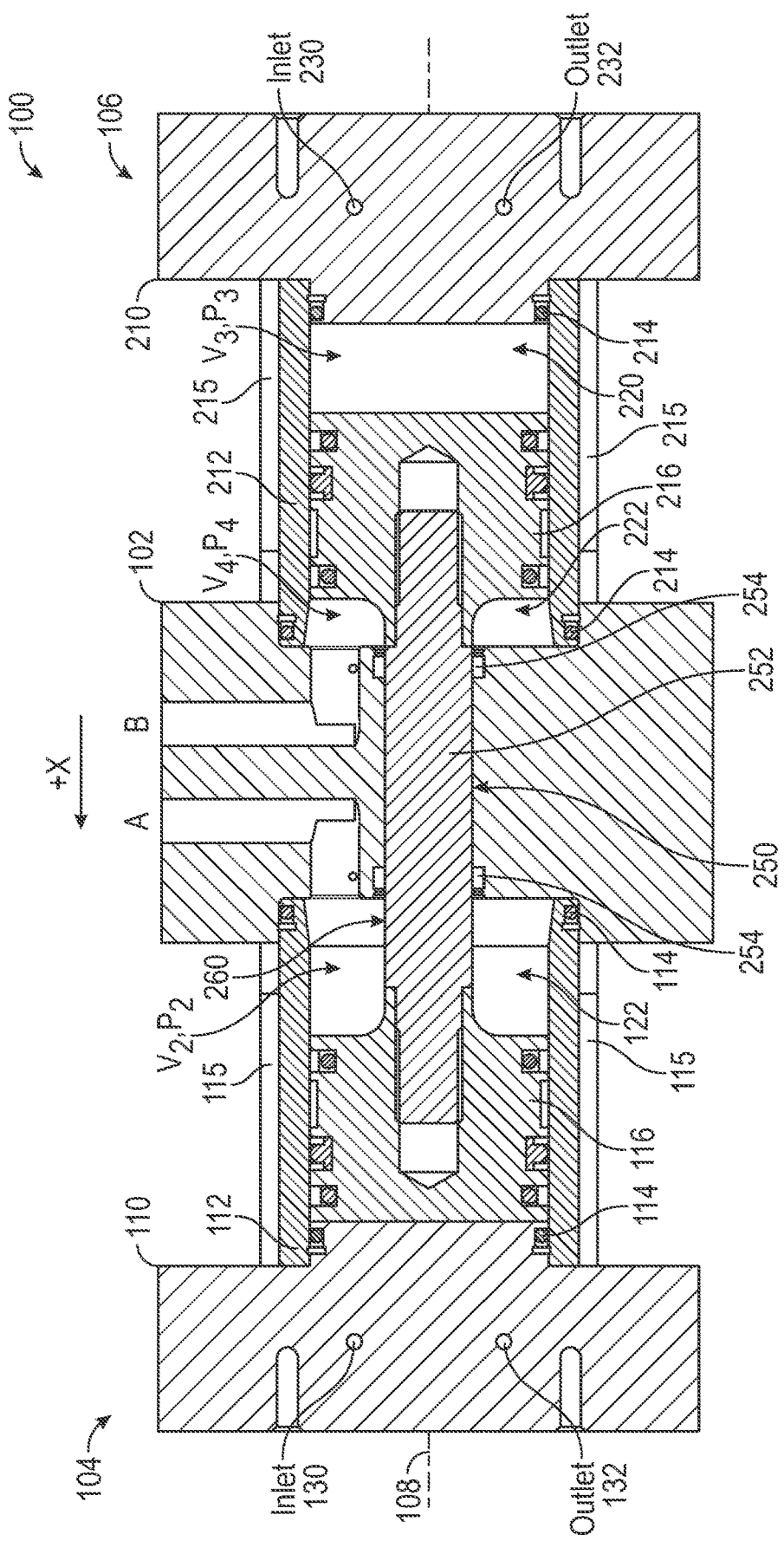
FIG. 9 is a front section view of the pump of FIG. 1 with the piston assembly in the extreme left position.
Figure 10:
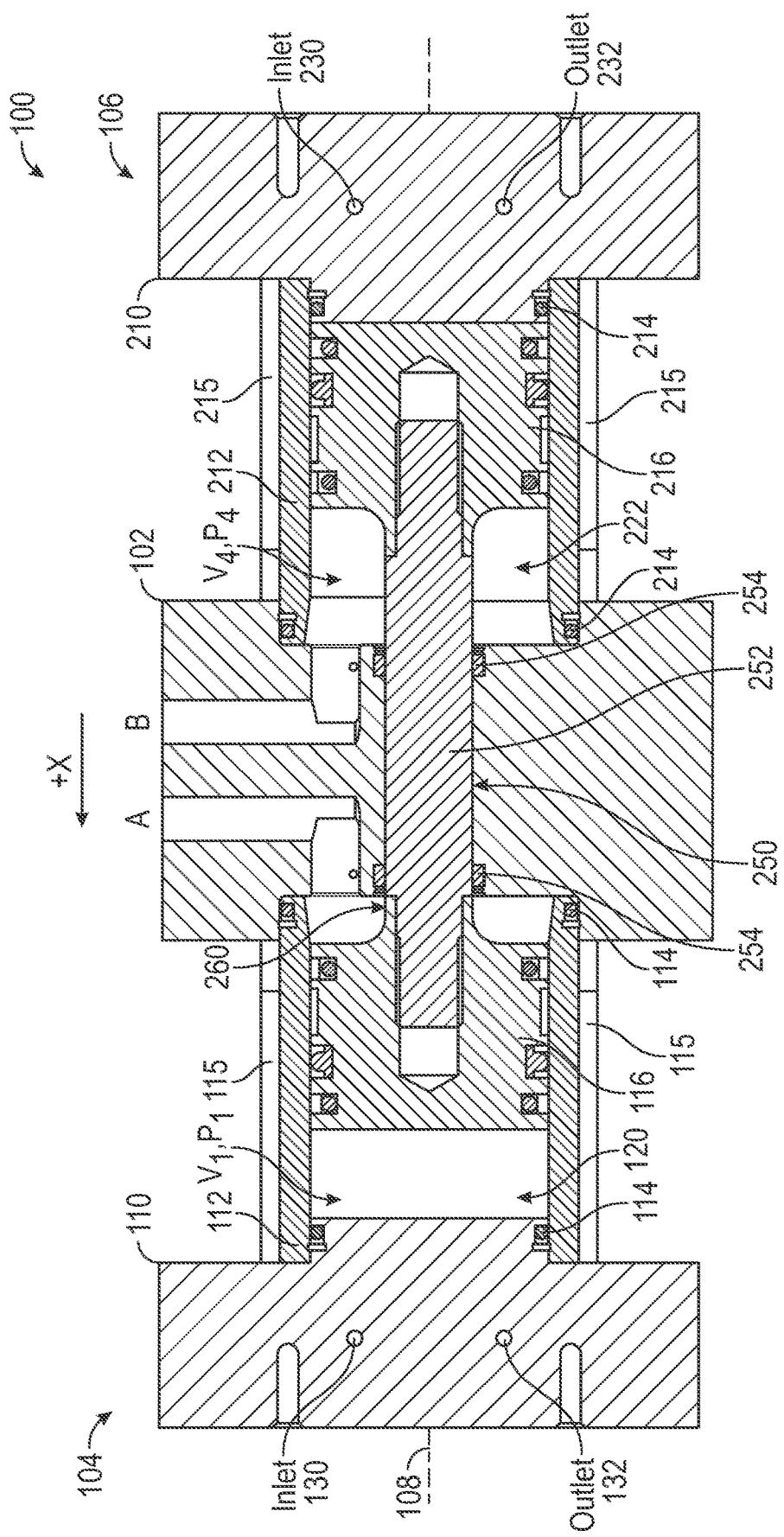
FIG. 10 is a front section view of the pump of FIG. 1 with the piston assembly in an extreme right position.

Referring to FIGS. 2, 9, and 10, a cycle of the pump 100 is shown and described according to an exemplary embodiment. Although the piston assembly 260 is shown starting at a particular position, it should be understood that the piston assembly 260 may begin at any position and may begin by travelling in either direction.

As shown in FIG. 2, the piston assembly 260 begins in a central position (e.g., X=0). A pressurized fluid is supplied to the inner chamber 122 through the passage A, forcing the piston assembly 260 to move in the positive X direction (e.g., to the left as shown in FIG. 2). This decreases the volume $V_1$ of the outer chamber 120 and the volume $V_4$ of the inner chamber 222 and increases the volume $V_2$ of the inner chamber 122 and the volume $V_3$ of the outer chamber 220.

As the volume $V_1$ decreases, the pressure $P_1$ increases, and the outlet check valve 136 opens to permit pressurized fluid to exit through the outlet passage 132. Due to the pressure increase, the inlet check valve 134 closes, preventing fluid from flowing out through the inlet passage 130. As the volume $V_3$ increases, the pressure $P_3$ decreases, and the inlet check valve 234 opens to permit fluid to enter into the outer chamber 220 through the inlet passage 230. Due to the pressure decrease, the outlet check valve 236 closes, preventing fluid from flowing out through the outlet passage 232. Fluid may additionally flow out of the inner chamber 222 through the passage B. The piston assembly 260 may move in the first direction until the force of the fluid within the volume $V_2$ decreases (e.g., due to control by a control system), until the force of the fluid within another volume overcomes the force of the fluid within the volume $V_2$, or until the piston assembly 260 engages a hard stop (e.g., the cap 110 as shown in FIG. 9).

Subsequently, a pressurized fluid may be supplied to the inner chamber 222 through the passage B, forcing the piston assembly 260 to move in the negative X direction (e.g., to the right as shown in FIG. 2). This increases the volume $V_1$ of the outer chamber 120 and the volume $V_4$ of the inner chamber 222 and decreases the volume $V_2$ of the inner chamber 122 and the volume $V_3$ of the outer chamber 220.

As the volume $V_1$ increases, the pressure $P_1$ decreases, and the inlet check valve 134 opens to permit fluid to enter into the outer chamber 120 through the inlet passage 130. Due to the pressure decrease, the outlet check valve 136 closes, preventing fluid from flowing out through the outlet passage 132. As the volume $V_3$ decreases, the pressure $P_3$ increases, and the outlet check valve 236 opens to permit pressurized fluid to exit the outlet passage 232. Due to the pressure increase, the inlet check valve 234 closes, preventing fluid from flowing out through the inlet passage 230. Fluid may additionally flow out of the inner chamber 122 through the passage A. The piston assembly 260 may move in the second direction until the force of the fluid within the volume $V_4$ decreases (e.g., due to control by a control system), until the force of the fluid within another chamber overcomes the force of the fluid within the volume $V_4$, or until the piston assembly 260 engages a hard stop (e.g., the cap 210 as shown in FIG. 10). The movement direction of the piston assembly 260 may once again be reversed, and the cycle may be repeated.

Referring to FIGS. 2-4, 9, and 10, the due to the positions of the inlet passage 130 and the outlet passage 132 within the cap 110, the inlet passage 130, the outlet passage 132, the inlet check valve 134, and the outlet check valve 136 are all fluidly coupled to the outer chamber 120 throughout the entire range of motion of the piston assembly 260. Specifically, the inlet passage 130 and the outlet passage 132 face an end of the piston 116 such that the inlet passage 130 and the outlet passage 132 are not covered by a circumferential surface of the piston 116. Accordingly, the pump 100 can utilize the full stroke of the piston assembly 260 to pump fluid. Similarly, the inlet passage 230, the outlet passage 232, the inlet check valve 234, and the outlet check valve 236 are fluidly coupled to the outer chamber 220 throughout the entire range of motion of the piston assembly 260.

Pump Control

Figure 11:
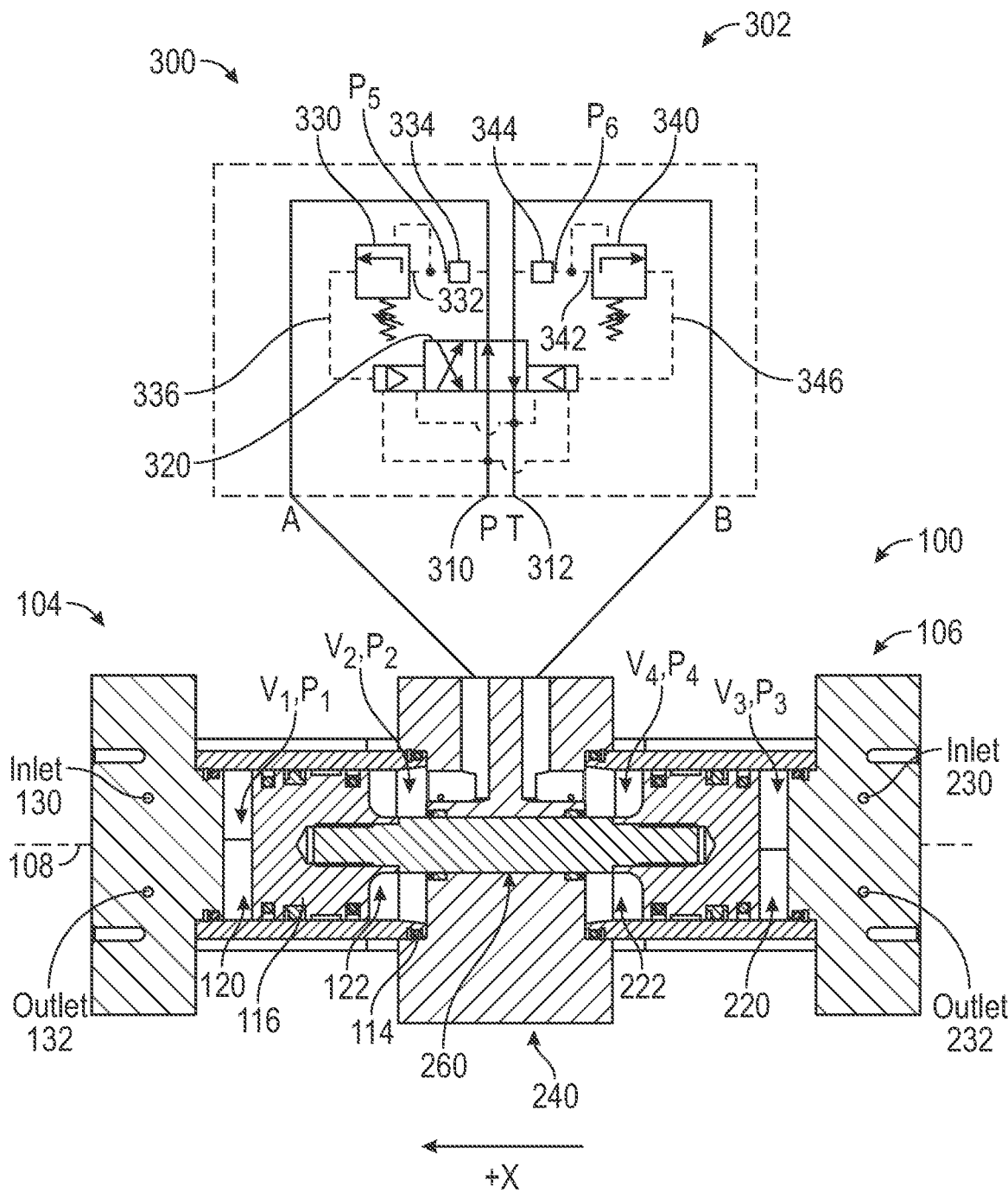
FIGS. 11-16 are schematic views of a pump system including the pump of FIG. 1 at various stages throughout a pumping cycle.

Referring to FIG. 11, the pump 100 is fluidly coupled to and controlled by a mechanical control system, valve assembly, or automatic pump controller, shown as pump controller 300, to form a pump system 302. The pump controller 300 is configured to repeatedly switch between (a) supplying pressurized fluid (e.g., pressurized hydraulic fluid) to a first chamber of the pump 100 and draining fluid from a second chamber of the pump 100 and (b) supplying pressurized fluid to the second chamber and draining fluid from the first chamber. By quickly repeating this process, the pump controller 300 causes the piston assembly 260 to oscillate or reciprocate such that the pump 100 pumps pressurized fluid out of the remaining third and fourth chambers of the pump 100.

In the embodiment shown in FIG. 11, the pump controller 300 is configured to supply a pressurized fluid to the inner chamber 122 and the inner chamber 222 to control movement of the piston assembly 260. In some embodiments, the fluid supplied by the pump controller 300 is hydraulic oil. As shown, the pump controller 300 is a mechanical controller that automatically changes the direction of movement of the piston assembly 260 based on the pressures $P_2$ and $P_4$ within the inner chamber 122 and the inner chamber 222, respectively. Specifically, when the pressure within one of the chambers exceeds a threshold pressure, the pump controller 300 changes the direction of movement of the piston assembly 260.

The pump controller 300 defines a first inlet, outlet, connection, passage, conduit, or port, shown as supply passage 310, that is fluidly coupled to a high pressure fluid source, shown as supply P, and a second inlet, outlet, connection, passage, conduit, or port, shown as tank passage 312, that is fluidly coupled to a low pressure fluid sink, shown as tank T. By way of example, the supply P may be a hydraulic pump that is supplied with hydraulic fluid from the tank T.

The supply passage 310 and the tank passage 312 are fluidly coupled to a flow control device (e.g., a spool valve, etc.) or directional control valve (DCV), shown as DCV 320. The DCV 320 is fluidly coupled to the passage A and the passage B (e.g., directly, indirectly through another conduit, etc.). As shown, the DCV 320 is a four-port, two-position valve. Specifically, the ports are fluidly coupled to the supply passage 310, the tank passage 312, the passage A, and the passage B, respectively. The DCV 320 is configured to control the flow between the ports based on a position of the valve (e.g., a position of a spool within the valve). In a first position, shown in FIG. 11, the DCV 320 fluidly couples the supply passage 310 to the passage A and fluidly couples the tank passage 312 to the passage B. In a second position, shown in FIG. 13, the DCV 320 fluidly couples the supply passage 310 to the passage B and fluidly couples the tank passage 312 to the passage A. In some embodiments, the DCV 320 has additional positions (e.g., a center position in which no flow is permitted through the DCV 320). In some embodiments, the DCV 320 is a single valve. In other embodiments, the DCV 320 is a combination of multiple valves. As shown, the position of the DCV 320 is hydraulically controlled. In other embodiments, the DCV 320 is otherwise controlled (e.g., electronically, pneumatically, etc.).

A first flow control device or control device, shown as relief valve 330, is fluidly coupled to the passage A through a first conduit, shown as sensing line 332. In some embodiments, a flow control device or flow resistor (e.g., an orifice, a valve, etc.), shown as orifice 334, is fluidly coupled between the sensing line 332 and the passage A. The orifice 334 is configured to restrict flow of fluid into the sensing line 332 from the passage A. The relief valve 330 is fluidly coupled to the DCV 320 through a second conduit, shown as control line 336.

Similarly, a second flow control device or control device, shown as relief valve 340, is fluidly coupled to the passage B through a second conduit, shown as sensing line 342. In some embodiments, a flow control device or flow resistor (e.g., an orifice, a valve, etc.), shown as orifice 344, is fluidly coupled between the sensing line 342 and the passage B. The orifice 344 is configured to restrict flow of fluid into the sensing line 342 from the passage B. In some embodiments, the sensing line 332 and/or the sensing line 342 are relatively low flow lines (e.g., as compared to the passage A or the passage B).

Figure 13:
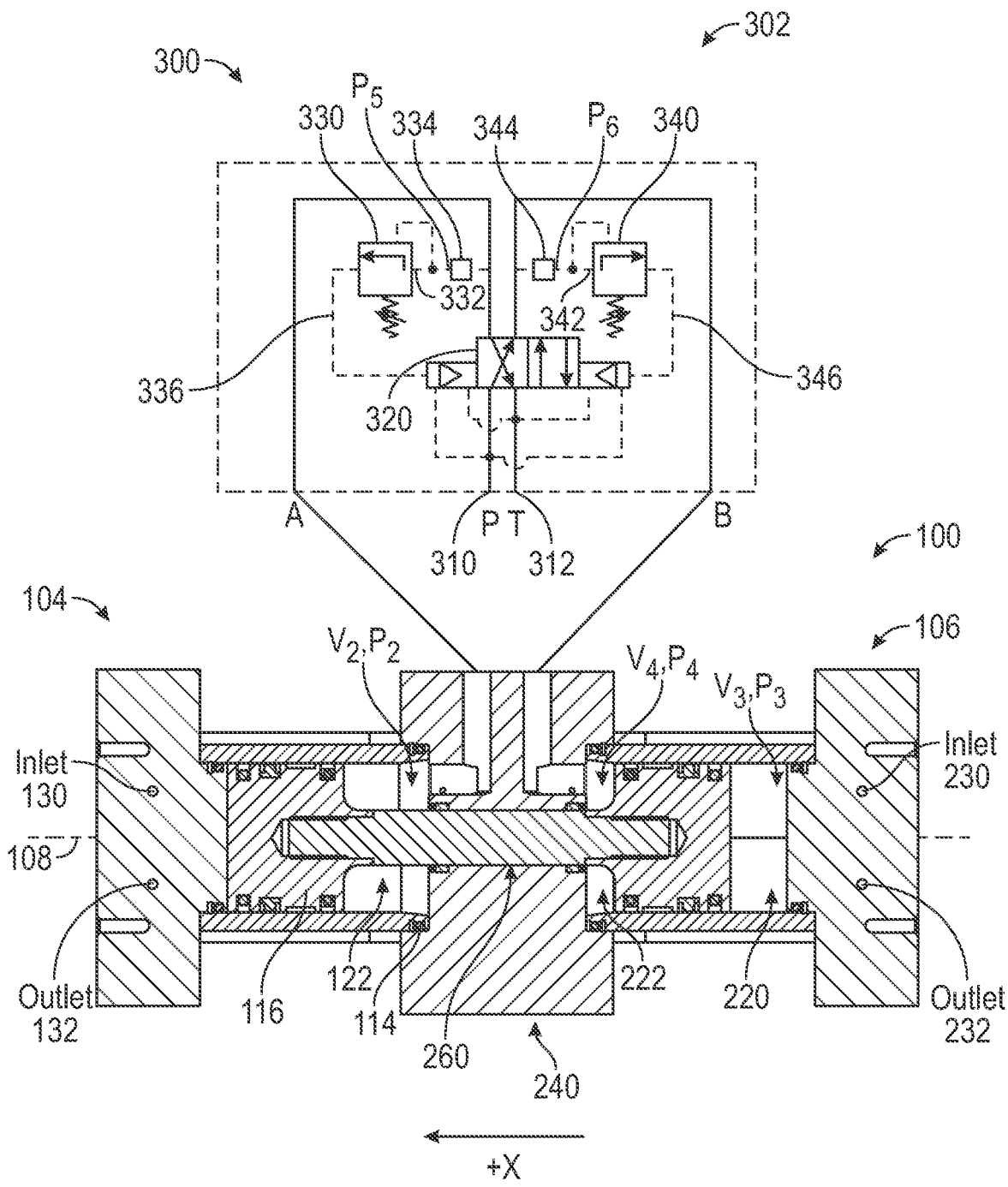

The relief valve 330 is configured to selectively couple the sensing line 332 to a first side of the DCV 320. When pressurized fluid is supplied to the passage A, it passes through the orifice 334 and into the sensing line 332. The relief valve 330 is biased into a closed position. As shown, the relief valve 330 is biased into a closed position by a spring that has a variable preload force. In other embodiments, the relief valve 330 is otherwise biased (e.g., by a spring with a fixed preload force, pneumatically, hydraulically, etc.). The relief valve 330 is controlled to move toward an open position by the pressurized fluid within the sensing line 332. Accordingly, when the pressure within the sensing line 332 exceeds a threshold pressure (i.e., a shift pressure for the relief valve 330), the force of the pressurized fluid overcomes the preload force of the spring, opening the relief valve 330. The shift pressure may be controlled by varying the preload force on the spring. When the relief valve 330 is opened, the pressurized fluid within the sensing line 332 passes through the relief valve 330 and the control line 336 to the first side of the DCV 320. The pressurized fluid at the first side forces the DCV 320 to move toward the second position (e.g., as shown in FIG. 13).

The relief valve 340 is configured to selectively couple the sensing line 342 to a second side of the DCV 320 opposite the first side. When pressurized fluid is supplied to the passage B, it passes through the orifice 344 and into the sensing line 342. The relief valve 340 is biased into a closed position. As shown, the relief valve 340 is biased into a closed position by a spring that has a variable preload force. In other embodiments, the relief valve 340 is otherwise biased (e.g., by a spring with a fixed preload force, pneumatically, hydraulically, etc.). The relief valve 340 is controlled to move toward an open position by the pressurized fluid within the sensing line 342. Accordingly, when the pressure within the sensing line 342 exceeds a threshold pressure (i.e., a shift pressure for the relief valve 340), the force of the pressurized fluid overcomes the preload force of the spring, opening the relief valve 340. The shift pressure may be controlled by varying the preload force on the spring. When the relief valve 340 is opened, the pressurized fluid within the sensing line 342 passes through the relief valve 340 and the control line 346 to the second side of the DCV 320. This pressurized fluid at the second side forces the DCV 320 to move toward the first position (e.g., as shown in FIG. 11).

The orifice 334 and the orifice 344 are configured to resist the flow of fluid therethrough. Accordingly, when the pressure within the passage A or the passage B is changing, a pressure differential is created across the orifice 334 or the orifice 344, respectively. The pressure within the sensing line 332 immediately downstream of the orifice 334 is referred to herein as pressure $P_5$, and the pressure within the sensing line 342 immediately downstream of the orifice 344 is referred to herein as pressure $P_6$. In other embodiments, the orifice 334 is positioned in a different location between the passage A and the DCV 320 (e.g., within the relief valve 330, along the control line 336, etc.). Similarly, the orifice 344 may be positioned in a different location between the passage B and the DCV 320 (e.g., within the relief valve 340, along the control line 346, etc.).

Referring to FIGS. 11-16, each stage of a full control cycle of the pump system 302 is shown and described. It should be understood that, although one stage is shown as the first step in this process, the pump system 302 may begin this cycle at any point throughout the process. In other embodiments, one or more stages are removed, reordered, or added to the cycle. Additionally, the fluid within the pump controller 300 and the inner chambers is described as being hydraulic oil, and the fluid within the outer chambers is described as being nitrogen gas. In other embodiments, one or both fluids are a different type of fluid.

The pressures within each chamber are described herein as reaching certain pressure thresholds or pressure ranges. As used herein, "system pressure" or "supply pressure" refers to the maximum pressure provided by the supply P (e.g., when no flow is occurring). In some embodiments, the supply pressure is 3250 psi. As used herein, "shift pressure" refers to the pressure at which the relief valve 330 and the relief valve 340 are configured to open. In some embodiments, the shift pressure is 3100 psi. As used herein, "filling pressure" is the pressure within the passage A or the passage B as the piston assembly 260 is moving. The filling pressure may be a single pressure or a range, and may depend upon the resistance of the piston assembly 260 to movement.

Pumping Cycle—Stage 1

Referring to FIG. 11, in stage 1 of the cycle, the DCV 320 is in the first position and the piston assembly 260 is somewhere between the extreme left position (i.e., the farthest position reached by the piston assembly 260 in the positive X direction) and the extreme right position (i.e., the farthest position reached by the piston assembly 260 in the negative X direction). The pressures within each chamber are described in Table 1 below:

TABLE 1

Pressures of Each Chamber in Stage 1

| Pressure | Location | Pressure Value |
|---|---|---|
| $P_1$ | Outer Chamber 120 | High Pressure/Nitrogen Compression |
| $P_2$ | Inner Chamber 122/Passage A | Filling Pressure |
| $P_3$ | Outer Chamber 220 | Low Pressure/Nitrogen Intake |
| $P_4$ | Inner Chamber 222/Passage B | Tank Pressure |
| $P_5$ | Sensing Line 332 | Variable |
| $P_6$ | Sensing Line 342 | Variable |

In stage 1, high pressure hydraulic oil is supplied from the supply P through the DCV 320 and the passage A and into the inner chamber 122. Similarly, hydraulic oil from the inner chamber 222 is permitted to drain through the passage B and the DCV 320 to the tank T. Pressurized hydraulic oil enters and expands the inner chamber 122, forcing the piston assembly 260 in the positive X direction. The volume $V_1$ of the outer chamber 120 is reduced, compressing the nitrogen therein and forcing nitrogen out through the outlet passage 132. The volume $V_3$ of the outer chamber 220 increases, drawing low pressure nitrogen into the outer chamber 220. The filling pressure within the passage A may be less than the system pressure provided by the supply P, as the inner chamber 122 is free to expand instead of building pressure. The pressures in the sensing lines may vary throughout stage 1. By way of example, the pressure $P_5$ may begin relatively low and increase gradually (e.g., due to exposure to the filling pressure through the orifice 334), and the pressure $P_6$ may begin relatively high and decrease gradually (e.g., due to exposure to the tank pressure through the orifice 344).

Pumping Cycle—Stage 2

Figure 12:
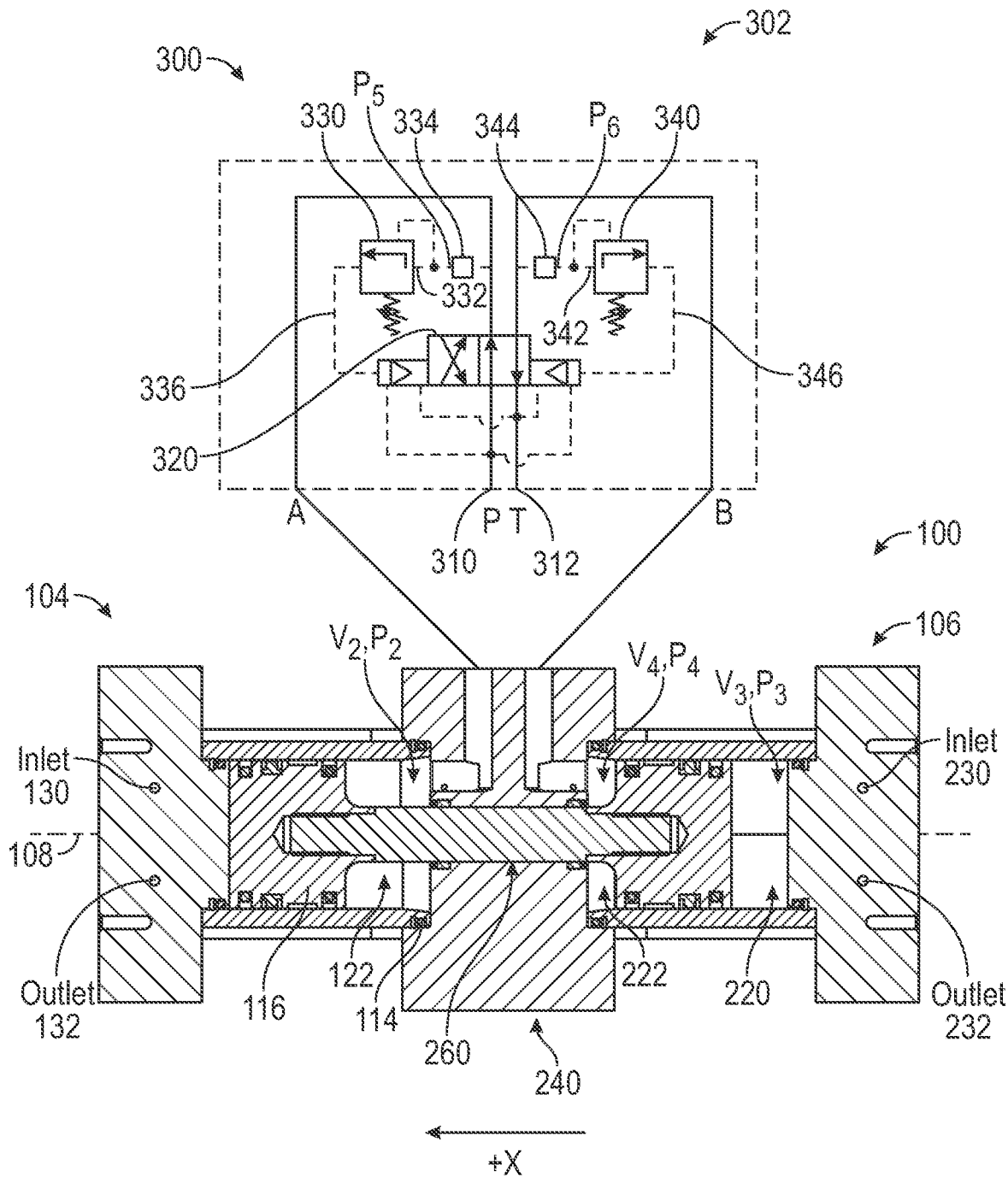

Referring to FIG. 12, in stage 2 of the cycle, the DCV 320 remains in the first position and the piston assembly 260 is at or near the extreme left position (i.e., the farthest position reached by the piston assembly 260 in the positive X direction). As shown herein, the piston assembly 260 is bottomed out (e.g., contacting the cap 110) in the extreme left position. In other embodiments, the extreme left position is elsewhere. The pressures within each chamber are described in Table 2 below:

TABLE 2

Pressures of Each Chamber in Stage 2

| Pressure | Location | Pressure Value |
|---|---|---|
| $P_1$ | Outer Chamber 120 | High Pressure/Nitrogen Compression |
| $P_2$ | Inner Chamber 122/Passage A | Shift Pressure |
| $P_3$ | Outer Chamber 220 | Low Pressure/Nitrogen Intake |
| $P_4$ | Inner Chamber 222/Passage B | Tank Pressure |
| $P_5$ | Sensing Line 332 | Below Shift Pressure |
| $P_6$ | Sensing Line 342 | Below Shift Pressure |

In stage 2, the piston assembly 260 experiences resistance to further movement in the positive X direction (e.g., due to an increased nitrogen pressure within the outer chamber 120, due to the piston assembly 260 encountering a hard stop, etc.). Accordingly, the pressure $P_2$ increases until it reaches the shift pressure. Due to the delay in pressure communication introduced by the orifice 334, the pressure $P_5$ has not yet reached the shift pressure, and thus the relief valve 330 has not moved to the open position.

Pumping Cycle—Stage 3

Referring again to FIG. 12, in stage 3 of the cycle, the DCV 320 switches to the second position and the piston assembly 260 remains at or near the extreme left position (i.e., the farthest position reached by the piston assembly 260 in the positive X direction). The pressures within each chamber are described in Table 3 below:

TABLE 3

Pressures of Each Chamber in Stage 3

| Pressure | Location | Pressure Value |
| --- | --- | --- |
| $P_1$ | Outer Chamber 120 | High Pressure/Nitrogen Compression |
| $P_2$ | Inner Chamber 122/Passage A | Supply Pressure |
| $P_3$ | Outer Chamber 220 | Low Pressure/Nitrogen Intake |
| $P_4$ | Inner Chamber 222/Passage B | Tank Pressure |
| $P_5$ | Sensing Line 332 | Shift Pressure |
| $P_6$ | Sensing Line 342 | Below Shift Pressure |

In stage 3, the piston assembly 260 is located in the extreme left position. Due to the delay introduced by the orifice 334, the pressure $P_2$ increases until reaching the supply pressure prior to activation of the relief valve 330. After the pressure $P_2$ has increased to the point of reaching the supply pressure, the pressure $P_5$ reaches the shift pressure, causing the relief valve 330 to move to the open position. This permits the pressurized hydraulic oil to pass through the relief valve 330 to the first end of the DCV 320, forcing the DCV 320 into the second position and beginning movement of the piston assembly 260 in the negative X direction.

Pumping Cycle—Stage 4

Figure 14:
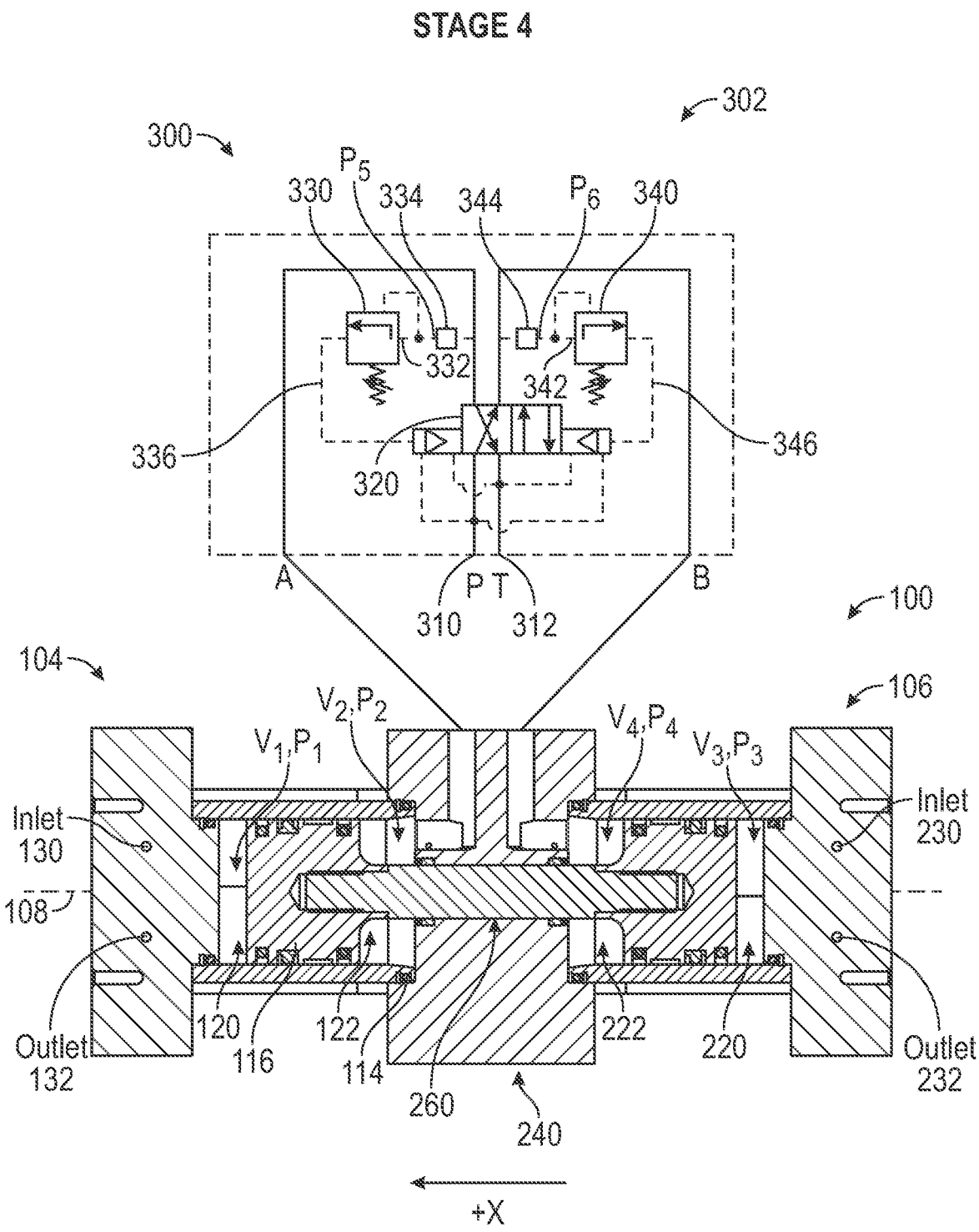

Referring to FIG. 14, in stage 4 of the cycle, the DCV 320 is in the second position and the piston assembly 260 is somewhere between the extreme left position (i.e., the farthest position reached by the piston assembly 260 in the positive X direction) and the extreme right position (i.e., the farthest position reached by the piston assembly 260 in the negative X direction). The pressures within each chamber are described in Table 4 below:

TABLE 4

Pressures of Each Chamber in Stage 4

| Pressure | Location | Pressure Value |
| --- | --- | --- |
| $P_1$ | Outer Chamber 120 | Low Pressure/Nitrogen Intake |
| $P_2$ | Inner Chamber 122/Passage A | Tank Pressure |
| $P_3$ | Outer Chamber 220 | High Pressure/Nitrogen Compression Low |
| $P_4$ | Inner Chamber 222/Passage B | Filling Pressure |
| $P_5$ | Sensing Line 332 | Variable |
| $P_6$ | Sensing Line 342 | Variable |

In stage 4, high pressure hydraulic oil is supplied from the supply P through the DCV 320 and the passage B and into the inner chamber 222. Similarly, hydraulic oil from the inner chamber 122 is permitted to drain through the passage A and the DCV 320 to the tank T. Pressurized hydraulic oil enters and expands the inner chamber 222, forcing the piston assembly 260 in the negative X direction. The volume $V_3$ of the outer chamber 220 is reduced, compressing the nitrogen therein and forcing nitrogen out through the outlet passage 232. The volume $V_1$ of the outer chamber 120 increases, drawing low pressure nitrogen into the outer chamber 120. The filling pressure within the passage B may be less than the system pressure provided by the supply P, as the inner chamber 222 is free to expand instead of building pressure. The pressures in the sensing lines may vary throughout stage 4. By way of example, the pressure $P_5$ may begin relatively high and decrease gradually (e.g., due to exposure to the tank pressure through the orifice 334), and the pressure $P_6$ may begin relatively low and increase gradually (e.g., due to exposure to the filling pressure through the orifice 344).

Pumping Cycle—Stage 5

Figure 15:
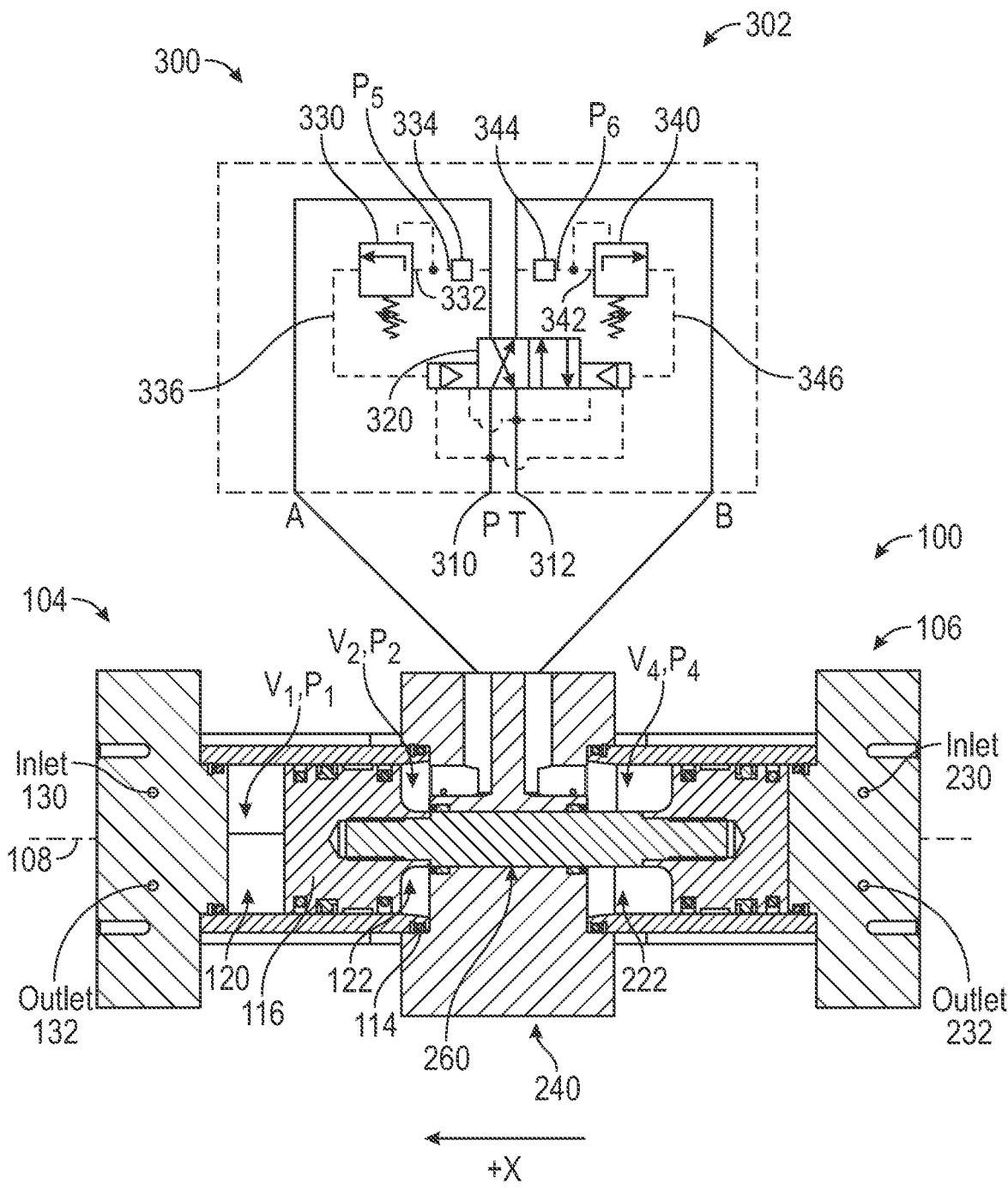
Figure 16:
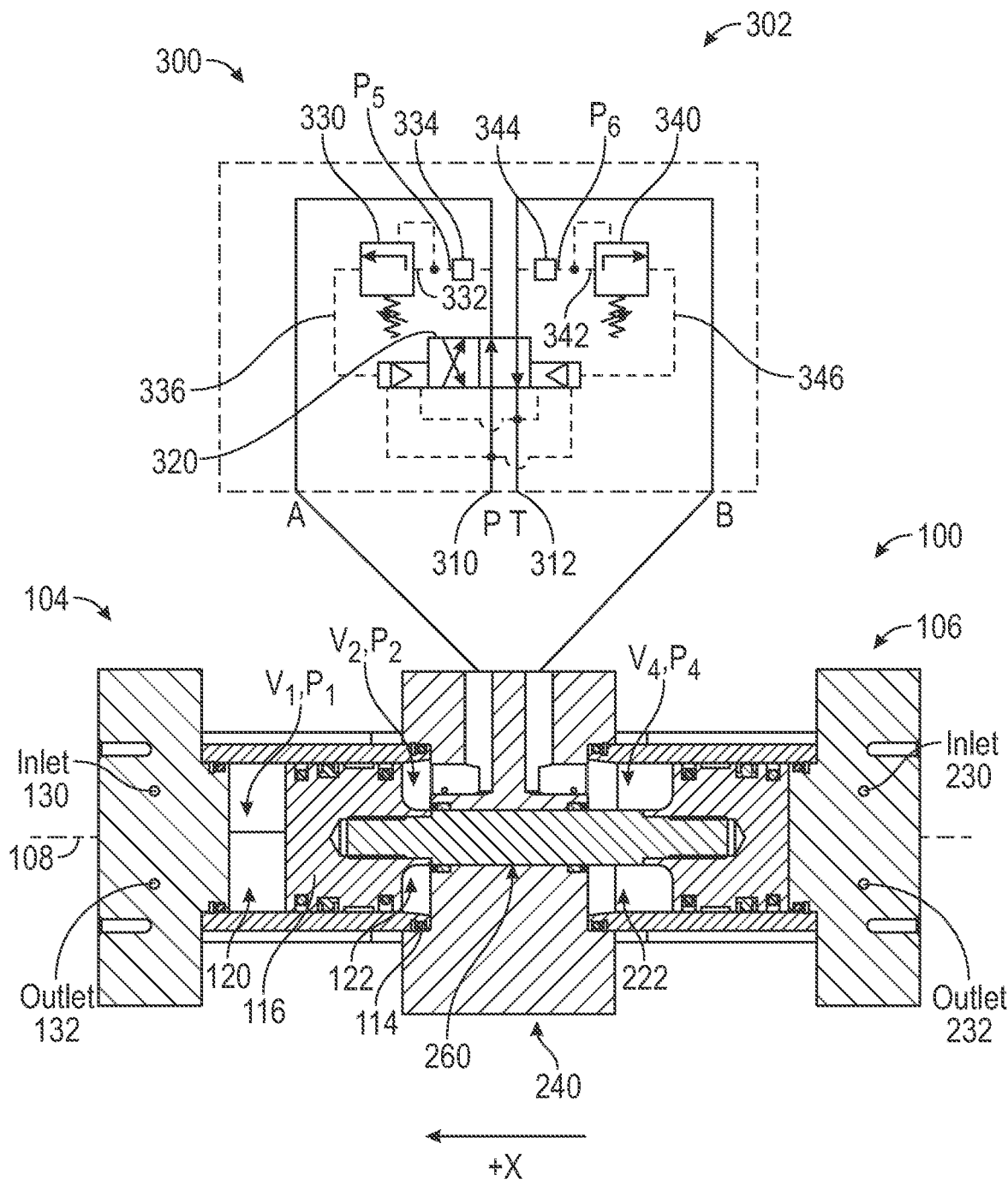

Referring to FIG. 15, in stage 5 of the cycle, the DCV 320 remains in the second position and the piston assembly 260 is at or near the extreme right position (i.e., the farthest position reached by the piston assembly 260 in the negative X direction). As shown herein, the piston assembly 260 is bottomed out (e.g., contacting the cap 210) in the extreme right position. In other embodiments, the extreme right position is elsewhere. The pressures within each chamber are described in Table 5 below:

TABLE 5

Pressures of Each Chamber in Stage 5

| Pressure | Location | Pressure Value |
| --- | --- | --- |
| $P_1$ | Outer Chamber 120 | Low Pressure/Nitrogen Intake |
| $P_2$ | Inner Chamber 122/Passage A | Tank Pressure |
| $P_3$ | Outer Chamber 220 | High Pressure/Nitrogen Compression |
| $P_4$ | Inner Chamber 222/Passage B | Shift Pressure |
| $P_5$ | Sensing Line 332 | Below Shift Pressure |
| $P_6$ | Sensing Line 342 | Below Shift Pressure |

In stage 5, the piston assembly 260 experiences resistance to further movement in the negative X direction (e.g., due to an increased nitrogen pressure within the outer chamber 220, due to the piston assembly 260 encountering a hard stop, etc.). Accordingly, the pressure $P_4$ increases until it reaches the shift pressure. Due to the delay in pressure communication introduced by the orifice 344, the pressure $P_6$ has not yet reached the shift pressure, and thus the relief valve 340 has not moved to the open position.

Pumping Cycle—Stage 6

Referring again to FIG. 16, in stage 6 of the cycle, the DCV 320 switches back to the first position and the piston assembly 260 remains at or near the extreme right position (i.e., the farthest position reached by the piston assembly 260 in the negative X direction). The pressures within each chamber are described in Table 6 below:

TABLE 6

Pressures of Each Chamber in Stage 6

| Pressure | Location | Pressure Value |
| --- | --- | --- |
| $P_1$ | Outer Chamber 120 | Low Pressure/Nitrogen Intake |
| $P_2$ | Inner Chamber 122/Passage A | Tank Pressure |
| $P_3$ | Outer Chamber 220 | High Pressure/Nitrogen Compression |
| $P_4$ | Inner Chamber 222/Passage B | Supply Pressure |
| $P_5$ | Sensing Line 332 | Below Shift Pressure |
| $P_6$ | Sensing Line 342 | Shift Pressure |

In stage 6, the piston assembly 260 is located in the extreme right position. Due to the delay introduced by the orifice 344, the pressure $P_4$ increases until reaching the supply pressure prior to activation of the relief valve 340. After the pressure $P_4$ has increased to the point of reaching the supply pressure, the pressure $P_6$ reaches the shift pressure, causing the relief valve 340 to move to the open position. This permits the pressurized hydraulic oil to pass through the relief valve 340 to the second end of the DCV 320, forcing the DCV 320 back into the first position and beginning movement of the piston assembly 260 in the positive X direction. The pump system 302 may then enter back into stage 1 of the cycle and repeat the process.

The speed of the pump 100 (e.g., the reciprocation rate in Hz, the flow rate of nitrogen out of the pump 100, etc.) is determined by the flow rate of fluid supplied by the supply P. If the flow rate of fluid from the supply P is increased, the pump 100 completes the pumping cycle faster. Accordingly, the flow rate of the pump 100 can be controlled by adding a flow control device between the supply P and the pump controller 300, or by controlling the supply P itself.

Because fluid can be supplied to both the inner chamber 122 and the inner chamber 222, the pump 100 is actively driven to throughout its entire range of motion. In other pumps, a piston is actively driven in a first direction, but relies on another force (e.g., from the compressed fluid, from a spring, etc.) to passively return it to its original position. When compared to these passively-returned pumps, the pump 100 can complete a pumping cycle more quickly and more reliably.

Beneficially, the orifice 334 and the orifice 344 increase the maximum output pressure of the pump 100 when compared to an identical embodiment where the orifice 334 and the orifice 344 are omitted. By delaying the shift of the DCV 320, the pressure is permitted to increase beyond the shift pressure (e.g., 3100 psi), all of the way to the system pressure (e.g., 3250 psi). If the orifice 334 and the orifice 344 were to be omitted, the passage A would be directly fluidly coupled to the relief valve 330 and the passage B would be directly fluidly coupled to the relief valve 340. Accordingly, the pressure $P_2$ would be substantially equal to the pressure $P_5$ and the pressure $P_4$ would be substantially equal to $P_6$ at all times. Accordingly, the DCV 320 would change positions immediately upon the pressure $P_2$ or the pressure $P_4$ reaching the shift pressure, such that stages 2 and 4 would effectively be omitted from the cycle.

Simply increasing the shift pressure to be closer to the system pressure would not provide the same benefit as the orifices 334, 344. Increasing the shift pressure would increase the pressure within the inner chamber 122 or the inner chamber 222 at the time of shifting. However, if the system pressure is not above the shift pressure, then the relief valve may not successfully open. If the system pressure is too close to the shift pressure, a fluctuation in system pressure (e.g., due to another load on the supply P) could prevent the relief valves 330, 340 from opening. Accordingly, increasing the difference between the shift pressure and the system pressure ensures that this does not occur. The use of the orifices 334, 344 permits the use of the full system pressure without the potential for an unsuccessful shift.

Figure 17:
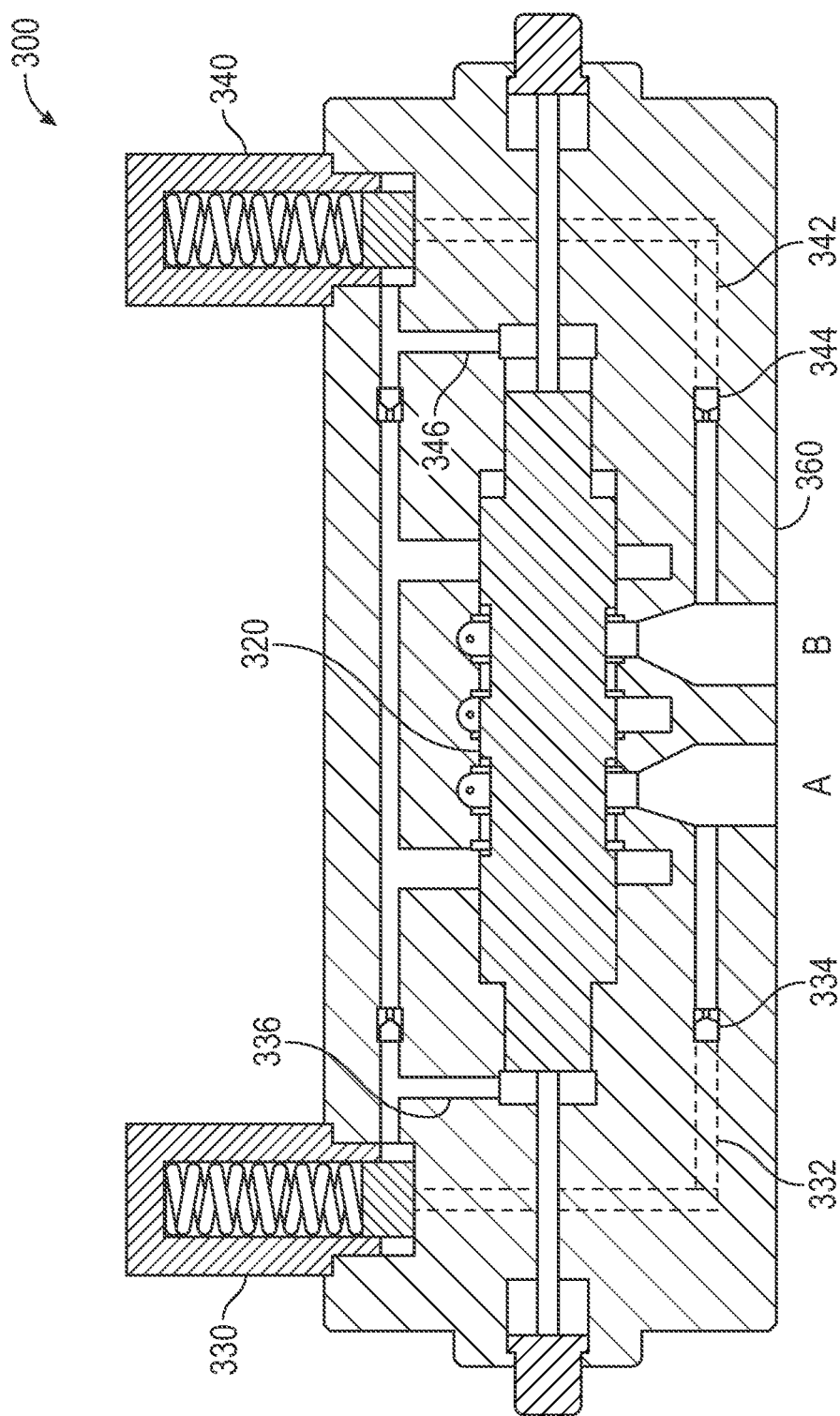
FIG. 17 is a section view of a pump controller of a pump system, according to an exemplary embodiment.

Referring to FIG. 17, a layout of the pump controller 300 is shown according to an exemplary embodiment. In this embodiment, the relief valves 330, 340, and the DCV 320 are all built into a housing 360. The housing 360 at least partially defines the sensing line 332, the control line 336, the sensing line 342, the control line 346, the passage A, and the passage B. As shown, the orifice 334 is positioned between the sensing line 332 and the passage A, and the orifice 334 is positioned between the sensing line 342 and the passage B.

In other embodiments, the orifice 334 and/or the orifice 344 are otherwise located. By way of example, the orifice 334 may be positioned along the control line 336. By way of another example, the orifice 334 may be positioned within the relief valve 330. Moving the orifices within or downstream of the relief valves may cause the relief valves to shift more quickly (e.g., when the passage A or the passage B reaches the shift pressure. However, the orifices may still delay the pressurized fluid reaching the DCV 320, and thus delay the shifting of the DCV 320 between the first and second positions.

Electronic Pump Control System

Figure 18:
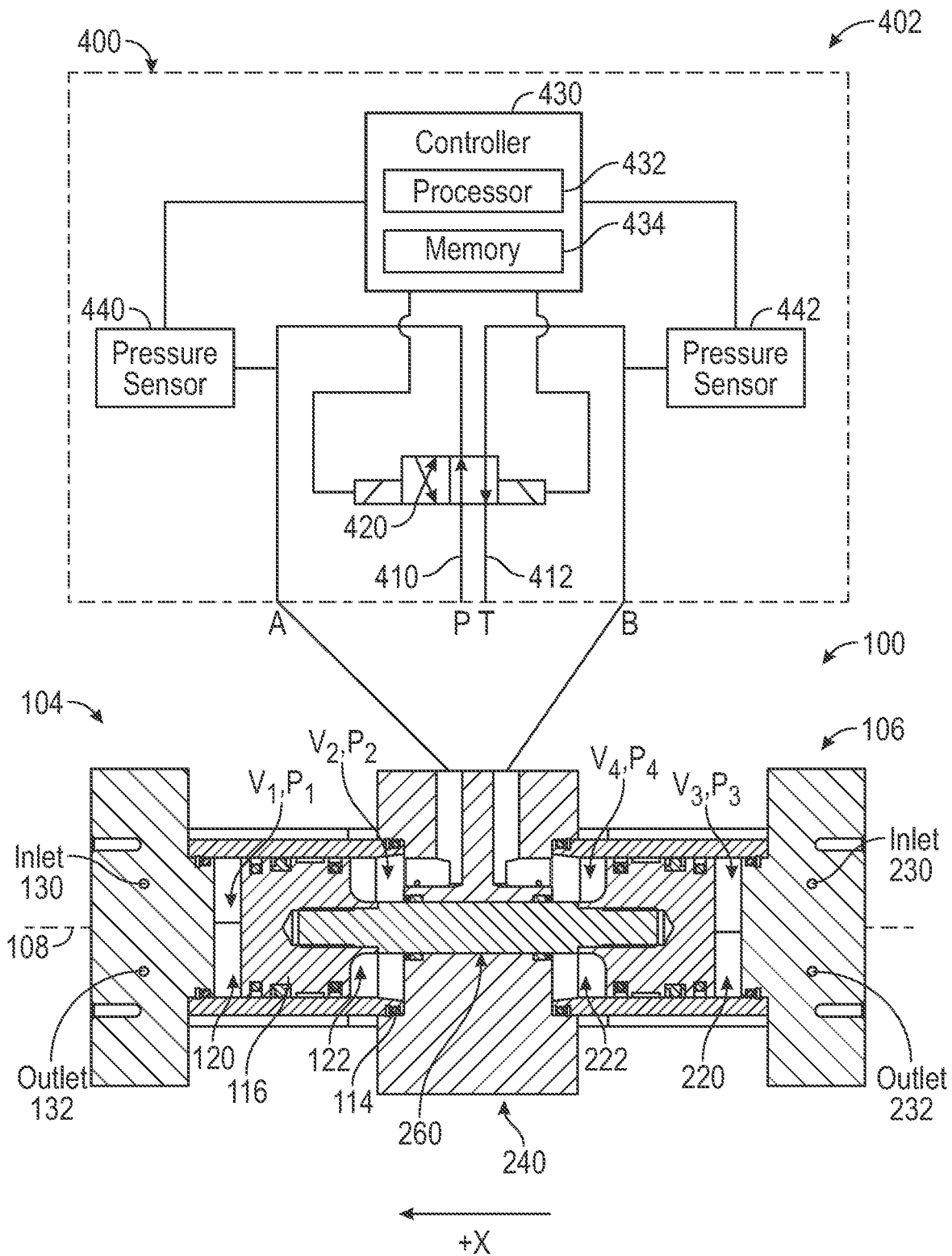
FIG. 18 is a schematic view of a pump system including the pump of FIG. 1, according to another exemplary embodiment.

Referring to FIG. 18, a pump system 402 is shown as an alternative embodiment to the pump system 302. The pump system 402 may be substantially similar to the pump system 302 except as otherwise specified herein. The pump system 402 includes an electronic pump controller, shown as pump controller 400. The pump controller 400 is configured to alternately supply pressurized fluid to the passage A and the passage B, similar to the pump controller 300. However, the pump controller 400 senses and controls the pressure electronically instead of mechanically.

The pump controller 400 defines a supply passage 410 and a tank passage 412 that fluidly couple the supply P and the tank T, respectively, to a directional control valve, shown as DCV 420. The DCV 420 is substantially similar to the DCV 320 except the DCV 420 includes solenoids that move the DCV 420 between the first position and the second position in response to receiving electrical energy.

These solenoids are coupled to a processing circuit or control device, shown as controller 430. The controller 430 is configured to control the solenoids to change the position of the DCV 420. The controller 430 includes a processor 432 and a memory device, shown as memory 434. The memory 434 may store control logic for execution by the processor 432. The controller 430 is operatively coupled to a pair of pressure sensors (e.g., pressure transducers, etc.), shown as pressure sensor 440 and pressure sensor 442. The pressure sensor 440 is fluidly coupled to the passage A. The pressure sensor 440 is configured to sense the pressure of the fluid within the passage A and provide a signal indicative of the pressure to the controller 430. The pressure sensor 442 is fluidly coupled to the passage B. The pressure sensor 442 is configured to sense the pressure of the fluid within the passage B and provide a signal indicative of the pressure to the controller 430.

The controller 430 is configured to use the signals from the pressure sensor 440 and the pressure sensor 442 to control the pump 100 throughout a cycle similar to that described herein with reference to FIGS. 11-16. The controller 430 is configured to position the DCV 420 in the first position, permitting fluid to pass through the passage A and into the inner chamber 122. In response to the pressure sensed by the pressure sensor 440 reaching a threshold pressure (e.g., system pressure, etc.), the controller 430 is configured to move the DCV 420 to the second position, permitting fluid to pass through the passage B and into the inner chamber 222. In response to the pressure sensed by the pressure sensor 442 exceeding the threshold pressure, the controller 430 is configured to move the DCV 420 back to the first position, causing the pump 100 to reciprocate.

In alternative embodiments, the pressure sensor 440 is configured to sense the pressure $P_1$ within the outer chamber 120 and/or the pressure sensor 442 is configured to sense the pressure $P_3$ within the outer chamber 220. Due to the differing areas of each side of each piston, in such embodiments, the threshold pressures may be varied to achieve the desired shifting characteristics. In another alternative embodiment, the pressure sensors 440, 442 are omitted and a position sensor (e.g., a potentiometer, a linear variable differential transformer, one or more limit switches, etc.) is configured to provide a signal indicative of a positon of the piston assembly 260. In such an embodiment, the controller 430 may shift the position of the DCV 420 in response to signal from the position sensor indicating that the piston assembly 260 has reached a threshold X position (e.g., X=−1 inch or X=+1 inch, etc.).

Alternative Piston Geometries

Figure 19:
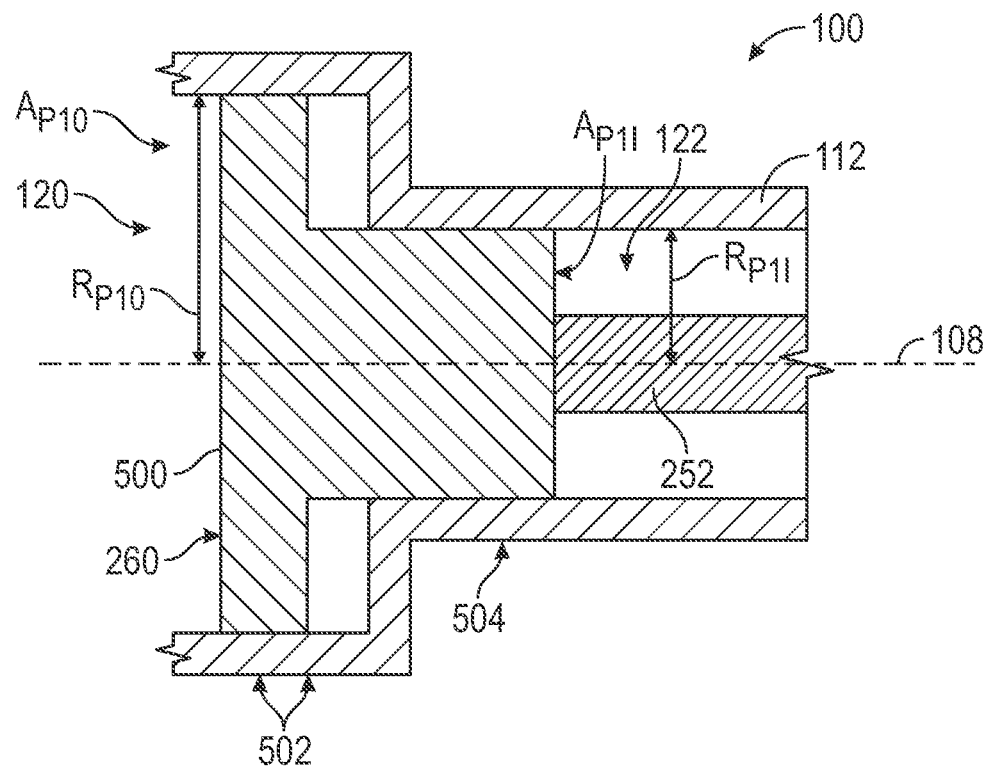
FIGS. 19 and 20 are partial section views of a pump, according to various exemplary embodiments.

Referring to FIG. 19, the pump 100 is shown according to an alternative embodiment. In this embodiment, the piston 116 is replaced with a piston 500. In the embodiment shown in FIGS. 5 and 7, the piston 116 has a constant radius $R_{P1}$. In contrast, the piston 500 of FIG. 19 is stepped such that a first portion 502 of the piston 500 that is adjacent to the outer chamber 120 has a radius $R_{P1O}$. A second portion 504 of the piston 500 that is adjacent to the inner chamber 122 has a radius $R_{P1I}$. The first portion 502 has a larger radius than the second portion 504 and thus has a larger area. The piston tube 112 is sized (e.g., stepped) to create a seal with the piston 500. In this embodiment, area $A_{P1O}$ of the outer surface of the piston 500 and the area $A_{P1I}$ of the inner surface of the piston can be calculated using the following equations:

$$A_{P1O} = \pi R_{P1O}^2 \qquad (10)$$

$$A_{P1I} = \pi R_{P1I}^2 - \pi R_R^2 \qquad (11)$$

By varying the sizes of each area, the force on the piston assembly 260 from the fluid in each chamber may be varied (e.g., as calculated using Equation 9). Accordingly, for a given system pressure, the output pressure of the pressurized fluid provided by the pump 100 may be varied. Similarly, for a given flow rate of fluid into the pump 100 from the pump controller 300, the flow rate of fluid pressurized fluid provided by the pump 100 may be varied.

Figure 20:
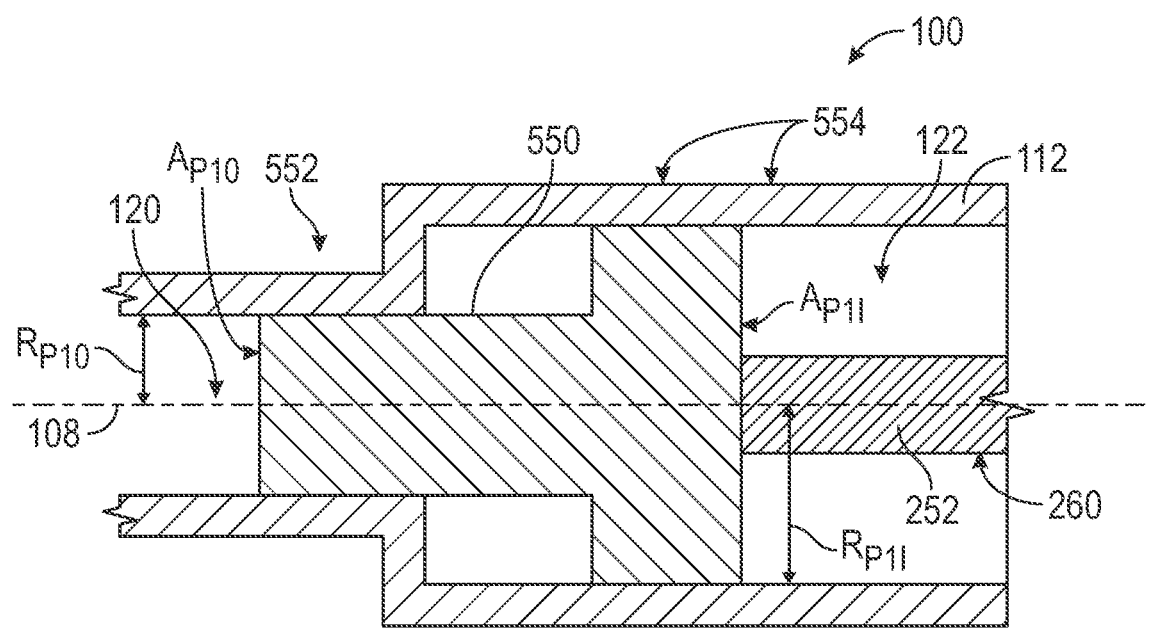

Referring to FIG. 20, the pump 100 is shown according to another alternative embodiment. The pump 100 of FIG. 20 is substantially similar to the pump 100 of FIG. 19, except the piston 500 is replaced with a piston 550. The piston 550 is stepped such that a first portion 552 of the piston 550 that is adjacent to the outer chamber 120 has a radius $R_{P1O}$. A second portion 554 of the piston 550 that is adjacent to the inner chamber 122 has a radius $R_{P1I}$. The first portion 552 has a smaller radius than the second portion 554 and thus has a larger area. This arrangement facilitates customization of the pressures and flow rates from the pump 100, similar to the arrangement of FIG. 19. In this embodiment, the area of the inner surface of the piston 116 and the area of the outer surface of the piston 116 may be made equal (e.g., by increasing the size of the inner surface to account for the area of the piston rod 252). Although the piston 500 and the piston 550 are shown as replacing the piston 116, it should be understood that the piston 500 or the piston 550 may additionally or alternatively replace the piston 216.

Inverted Chamber Arrangement

Figure 21:
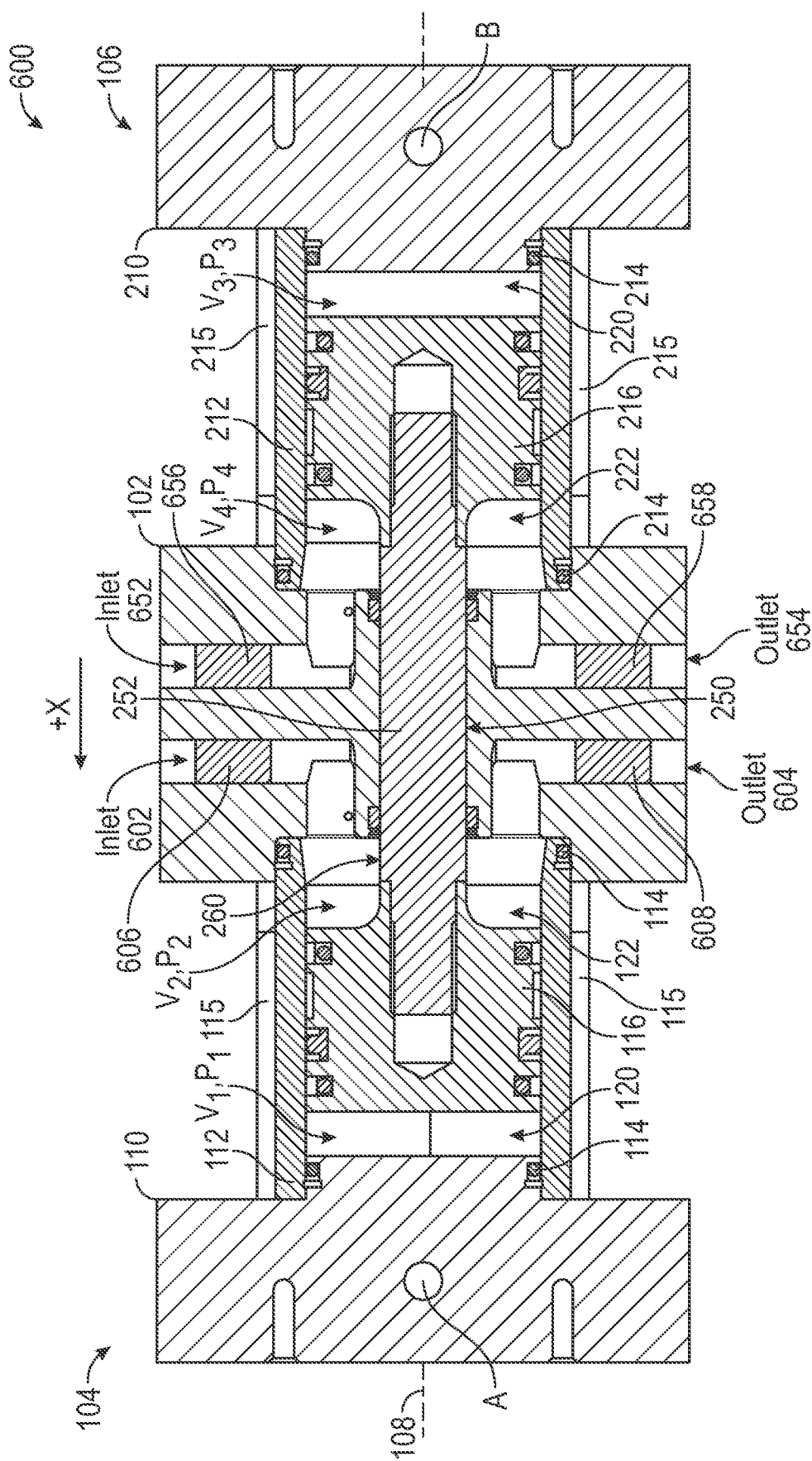
FIG. 21 is a front section view of a pump, according to another exemplary embodiment.

Referring to FIG. 21, a pump 600 is shown according to an exemplary embodiment. The pump 600 may be substantially similar to the pump 100 except as specified herein. In the pump 600, the functions of the inner and outer chambers are inverted. Specifically, the first fluid (e.g., hydraulic oil) from the pump controller 300 is supplied to the outer chambers 120, 220, and the second fluid (e.g., nitrogen) is compressed within the inner chambers 122, 222. As shown, the passage A passes through the cap 110 and is fluidly coupled to the outer chamber 120. The passage B passes through the cap 210 and is fluidly coupled to the outer chamber 220. An inlet passage 602 and an outlet passage 604 extend through the main body 102 and are fluidly coupled to the inner chamber 122. An inlet check valve 606 is positioned along the inlet passage 602, and an outlet check valve 608 is positioned along the outlet passage 604. An inlet passage 652 and an outlet passage 654 extend through the main body 102 and are fluidly coupled to the inner chamber 222. An inlet check valve 656 is positioned along the inlet passage 652, and an outlet check valve 658 is positioned along the outlet passage 654. The inlet passage 602, the outlet passage 604, the inlet passage 652, and the outlet passage 654 may function similarly to the inlet passage 130, the outlet passage 132, the inlet passage 230, and the outlet passage 232, respectively (e.g., by permitting nitrogen to enter and exit a corresponding chamber therethrough). Accordingly, in this embodiment, the pump controller 300 may be fluidly coupled to the outer chamber 120 and the outer chamber 220 to control movement of the piston assembly 260, and nitrogen may be compressed within the inner chamber 122 and the inner chamber 222.

Series Pump

Figure 22:
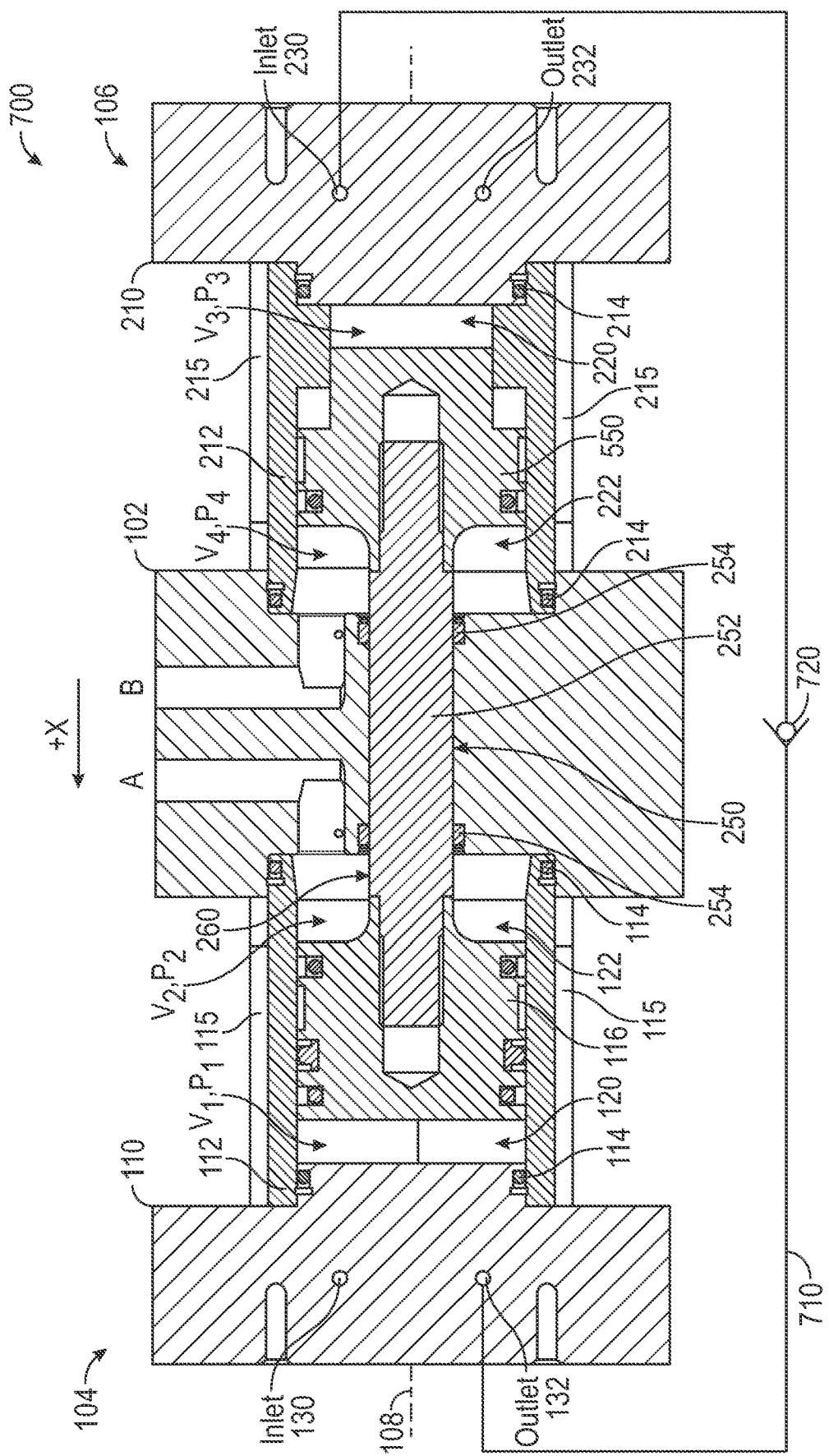
FIG. 22 is a front section view of a pump, according to another exemplary embodiment.

Referring to FIG. 22, a pump 700 is shown according to an alternative embodiment. The pump 700 may be substantially similar to the pump 100 except as specified herein. In this embodiment, the outlet passage 132 is fluidly coupled to inlet passage 230 by a conduit (e.g., a hose, a pipe, a passage, etc.), shown as conduit 710. Positioned along the length of the conduit 710 is a flow control device, shown as check valve 720. The check valve 720 is configured to permit the flow of fluid from the outlet passage 132 to the inlet passage 230. The check valve 720 is configured to prevent the flow of fluid from the inlet passage 230 to the outlet passage 132. In other embodiments, one or more of the outlet check valve 136, the inlet check valve 234, and the check valve 720 are omitted.

The piston 216 is replaced with the piston 550 (e.g., as shown in FIG. 20). This increases the pressure that the piston 550 exerts on the fluid within the outer chamber 220 relative to an embodiment that includes the piston 216. Accordingly, the fluid leaving the outer chamber 220 can reach a higher pressure.

During operation, the piston assembly 260 moves in the positive X direction such that the piston 116 compresses a fluid (e.g., nitrogen, etc.) within the outer chamber 120. As the pressure increases, some of the fluid is forced out of the outer chamber 120 through the outlet passage 132 and into the conduit 710. The piston 216 expands the outer chamber 220, drawing in fluid from the conduit 710. When the movement of the piston assembly 260 changes direction, the piston 550 compresses the fluid within the outer chamber 220. The inlet check valve 234, the check valve 720, and/or the outlet check valve 136 prevent the fluid from moving back into the outer chamber 120. Low pressure fluid is drawn into the outer chamber 120 through the inlet passage 130. Because the fluid passes in series from the outer chamber 120 to the outer chamber 220 during each cycle of the piston assembly 260, the fluid experiences two cycles of compression prior to leaving the pump 700. Due to this double compression and the stepped arrangement of the piston 550, the pump 700 can provide compressed fluid at a higher pressure than the pump 100, but at a lower flow rate.

Pump Implementation in Vehicle Suspension System

Figure 23:
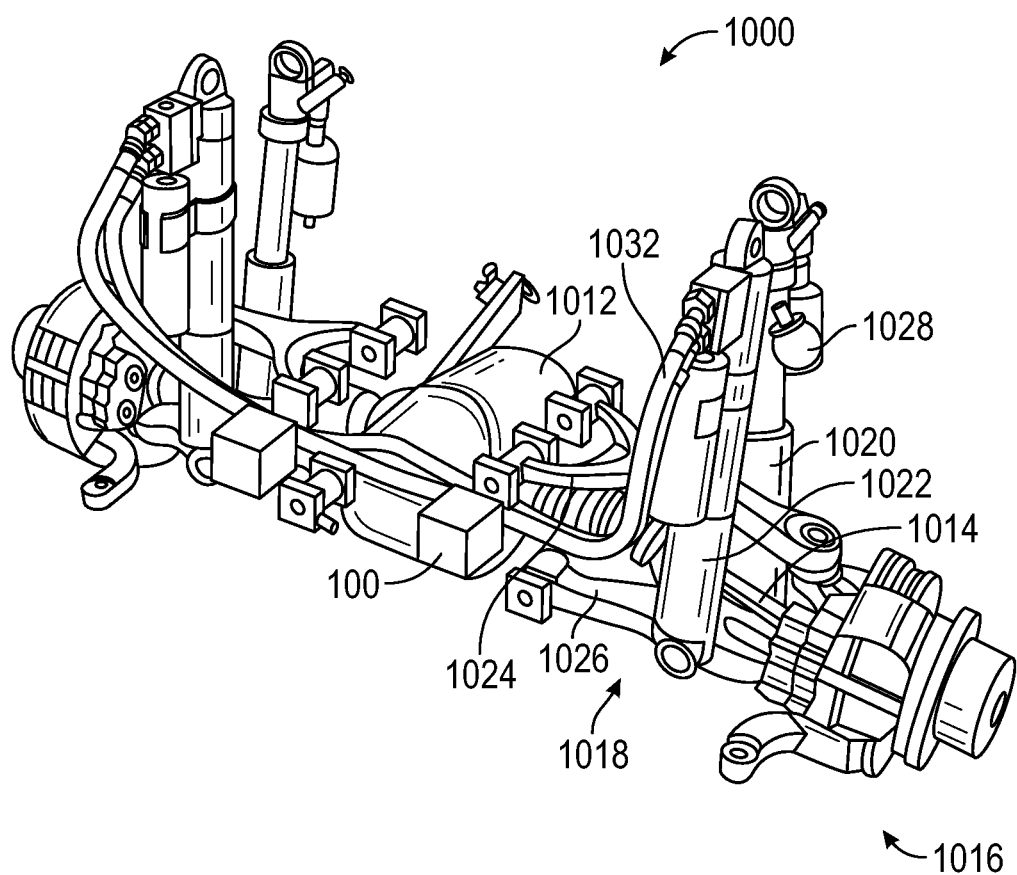
FIG. 23 is a front perspective view of an axle assembly for a vehicle, according to an exemplary embodiment.

In some embodiments, the pump system 302 is incorporated into a vehicle. Referring to the exemplary embodiment shown in FIGS. 23 and 24, an axle assembly 1000 is configured to be included as part of a vehicle. The vehicle may be a military vehicle, a utility vehicle (e.g., a fire truck, a tractor, construction equipment, a sport utility vehicle, etc.), or still another type of vehicle. As shown in FIG. 23, the axle assembly 1000 includes a differential 1012 coupled to a half shaft 1014. As shown in FIG. 23, the half shaft 1014 is coupled to a wheel-end assembly 1016. The wheel-end assembly 1016 may include brakes, a gear reduction, steering components, a wheel hub, a wheel, a tire, and other features. According to an exemplary embodiment, the differential 1012 is configured to be coupled to a drive shaft of the vehicle. Such a differential 1012 may receive rotational energy from a prime mover (e.g., a diesel engine, a gasoline engine, an electric motor, etc.) of the vehicle. The differential 1012 then allocates torque provided by the prime mover between the half shafts 1014 of the axle assembly 1000. The half shafts 1014 deliver the rotational energy to each wheel-end assembly 1016. According to an alternative embodiment, each wheel-end assembly 1016 includes a prime mover (e.g., the axle assembly 1000 includes electric motors that each drive one wheel).

According to an exemplary embodiment, the axle assembly 1000 includes a suspension system 1018 that couples the chassis of the vehicle to wheel-end assembly 1016. In some embodiments, the chassis includes a pair of opposing frame rails, and the suspension system 1018 engages the opposing frame rails through side plate assemblies. In other embodiments, the chassis is a hull, a capsule, or another type of structural member. According to an exemplary embodiment, the suspension system 1018 includes a spring, shown as gas spring 1020, and a damper, shown as hydraulic damper 1022. As shown in FIG. 23, the gas spring 1020 and the hydraulic damper 1022 are coupled in parallel to a lower support member, shown as lower swing arm 1026. According to an exemplary embodiment, the wheel-end assembly 1016 is coupled to lower swing arm 1026 and an upper support member, shown as upper swing arm 1024.

According to an exemplary embodiment, the vehicle is configured for operation on both smooth (e.g., paved) and uneven (e.g., off-road, rough, etc.) terrain. As the vehicle travels over uneven terrain, the upper swing arm 1024 and the lower swing arm 1026 guide the vertical movement of the wheel-end assembly 1016. A stop, shown as cushion 1028, provides an upper bound to the movement of the wheel-end assembly 1016. It should be understood that axle assembly 1000 may include similar components (e.g., wheel end assemblies, suspension assemblies, swing arms, etc.) for each of the two opposing lateral sides of a vehicle.

Figure 24:
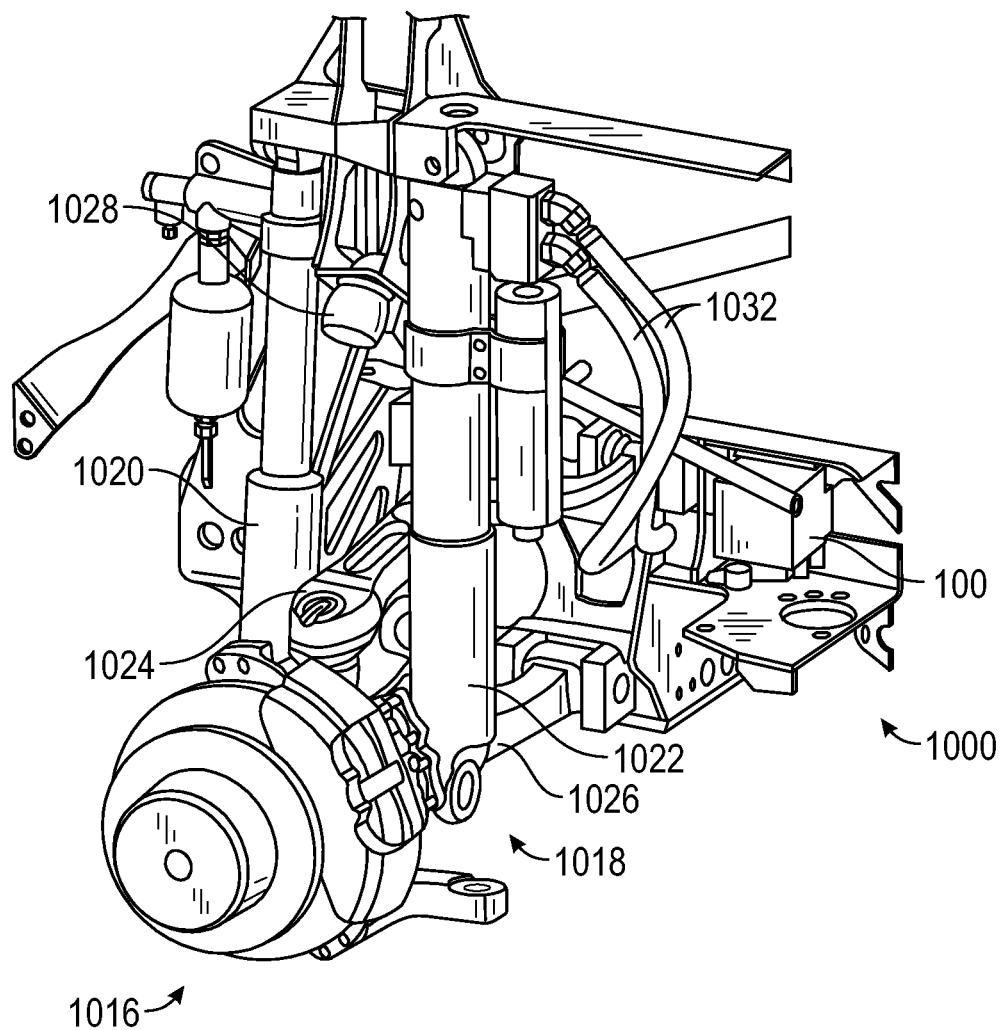
FIG. 24 is a side perspective view of the axle assembly of FIG. 23.

Referring next to the exemplary embodiment shown in FIG. 24, the suspension system 1018 includes various components configured to improve performance of the vehicle. As shown in FIG. 24, the gas spring 1020 is a high pressure gas spring. According to an exemplary embodiment, the suspension system 1018 includes the pump 100, coupled to gas spring 1020. Although the pump 100 is shown, it should be understood that any of the variants of the pump 100 (e.g., the pump 600, the pump 700, etc.) disclosed herein may be used instead of the pump 100. In some embodiments, suspension system 1018 includes a plurality of pumps 100 each coupled to a separate gas spring 1020. In other embodiments, the suspension system 1018 includes fewer pumps 100 than gas springs 1020. According to an exemplary embodiment, the gas spring and the pump include gas made up of at least 90% inert gas (e.g., nitrogen, argon, helium, etc.). The gas may be stored, provided, or received in one or more reservoirs (e.g., tank, accumulators, etc.). During operation, the pump 100 selectively provides gas, under pressure, to at least one of the gas springs 1020 and the reservoir. By providing gas to the gas springs 1020 or removing gas from the gas springs 1020, the pump 100 can control a ride height of the vehicle and/or one or more response characteristics of the suspension system 1018 to an external stimulus (e.g., driving over a bump or hole, etc.).

Figure 25:
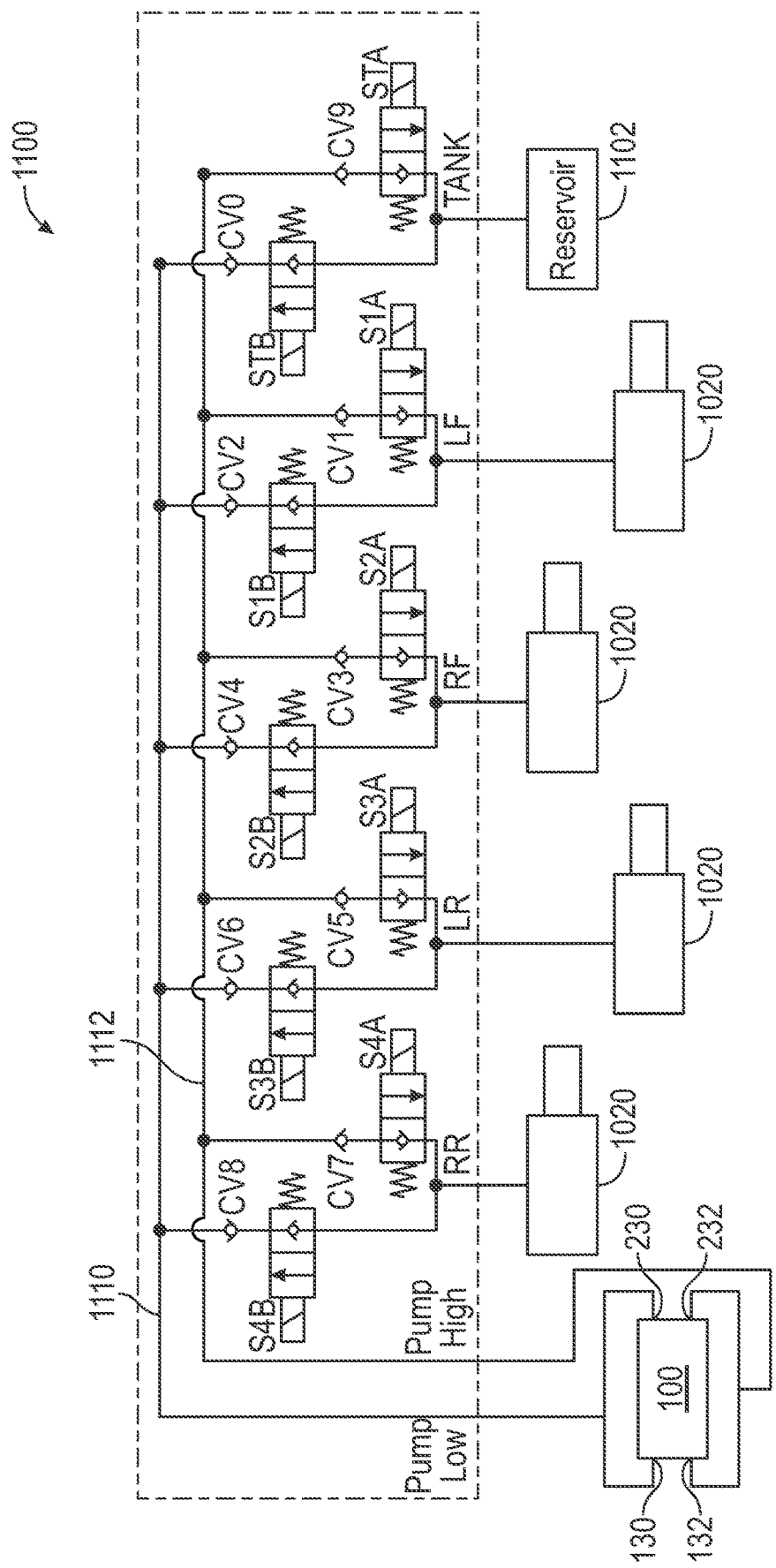
FIG. 25 is a schematic view of a suspension control assembly for the vehicle of FIG. 23, according to an exemplary embodiment.

Referring to FIGS. 25, a hydraulic control assembly, shown as suspension control assembly 1100, is shown according to an exemplary embodiment. The suspension control assembly 1100 is configured to control the flow of nitrogen to each gas spring 1020 of a vehicle. In this embodiment, the vehicle includes four suspension systems 1018, one at each corner of the vehicle, and each including a gas spring 1020. The suspension control assembly 1100 includes five ports: a port RR fluidly coupled to a right-rear gas spring 1020; a port LR fluidly coupled to a left-rear gas spring 1020; a port RF fluidly coupled to a right-front gas spring 1020; a port LF fluidly coupled to a left-front gas spring 1020; and a port TANK fluidly coupled to a low pressure gas source, shown as low pressure reservoir 1102. Pressurized nitrogen passes into or out of each gas spring 1020 through the corresponding port, raising or lowering the ride height of the corresponding portion (e.g., corner) of the vehicle, respectively. The reservoir 1102 may be a tank, an accumulator, a pressure vessel, or any other type of container configured to contain and/or provide a relatively low pressure volume of nitrogen.

Referring to FIGS. 2 and 25, a low pressure bus, shown as low pressure manifold 1110, is fluidly coupled to the inlet passage 130 and the inlet passage 230 of the pump 100 to supply low pressure nitrogen to the outer chamber 120 and the outer chamber 220. A high pressure bus, shown as high pressure manifold 1112, is fluidly coupled to the outlet passage 132 and the outlet passage 232 of the pump 100 to receive high pressure nitrogen from the outer chamber 120 and the outer chamber 220 of the pump 100. A series of flow control devices (e.g., check valves and directional control valves) control the flow of gas between (a) the low pressure manifold 1110 and the high pressure manifold 1112 and (b) each gas spring 1020 and the reservoir 1102. As shown, the directional control valves are solenoid activated and spring returned. In other embodiments, the directional control valves are otherwise controlled. Actuation of the directional control valves and the pump may be controlled by an electronic suspension controller of the vehicle or by another type of controller.

To control the flow of gas to and from the port LF, the suspension control assembly 1100 includes a first directional control valve, shown as valve S1A, a second directional control valve, shown as valve S1B, a first check valve, shown as check valve CV1, and a second check valve, shown as check valve CV2. Each directional control valve is a two-position valve. Each directional control valve includes a check valve that (a) prevents flow of nitrogen therethrough in a first direction and (b) permits flow of nitrogen therethrough in a second direction opposite the first direction when the directional control valve is in a closed position. When in an open position, each directional control valve permits flow therethrough in at least the first direction.

The check valve CV1 is configured to prevent flow of fluid from the port LF to the high pressure manifold 1112. Similarly, the check valve CV2 is configured to prevent flow of fluid from the low pressure manifold 1110 to the port LF. In the closed position, the valve S1A prevents flow of fluid from the high pressure manifold 1112 to the port LF. In the open position, the valve S1A fluidly couples the port LF to the high pressure manifold 1112. In the closed position, the valve S1B prevents flow of fluid from the port LF to the low pressure manifold 1110. In the open position, the valve S1B fluidly couples the port LF to the low pressure manifold 1110.

To add nitrogen to the gas spring 1020 of the port LF, the valve S1A can be opened to permit nitrogen from the high pressure manifold 1112 to enter into the port LF. To add nitrogen to the high pressure manifold 1112 (e.g., if the pressure in the high pressure manifold 1112 is too low, etc.), the pump 100 may be activated to introduce nitrogen into the high pressure manifold 1112. To remove nitrogen from the gas spring 1020 of the port LF, the valve S1B can be opened to permit nitrogen from the port LF to enter the low pressure manifold 1110. To remove nitrogen from the low pressure manifold 1110 (e.g., if the pressure in the low pressure manifold 1110 is too high, etc.), the pump 100 may be activated to draw nitrogen out of the low pressure manifold 1110.

Each other port of the suspension control assembly 1100 is coupled to similar valves to the port LF that can be similarly controlled to add nitrogen to the port or remove nitrogen from the port. Specifically, to perform similar functions to the check valve CV1, the check valve CV2, the valve S1A, and the S1B: the port RF is coupled to a check valve CV3, a check valve CV4, a valve S2A, and a valve S2B; the port LR is coupled to a check valve CV5, a check valve CV6, a valve S3A, and a valve S3B; the port RR is coupled to a check valve CV7, a check valve CV8, a valve S4A, and a valve S4B; and the port TANK is coupled to a check valve CV9, a check valve CV0, a valve STA, and a valve STB. By opening closing these valves, nitrogen may be moved between the gas springs 1020, the reservoir 1102, and the pump 100. In some embodiments, the assembly of the suspension control assembly 1100, the pump 100, the gas springs 1020, and the reservoir 1102 is a closed system containing a fixed amount of nitrogen.

Referring to FIGS. 2 and 25, in this arrangement, the pump 100 is always coupled to the low pressure manifold 1110 and the high pressure manifold 1112. Due to the coupling arrangement provided by the inlet check valve 134 and the inlet check valve 234, the pressure within the outer chamber 120 and the outer chamber 220 is always at least the pressure of the low pressure manifold 1110. During operation, when one outer chamber becomes pressurized, the other maintains the pressure of the low pressure manifold 1110. As shown in Equation 9, this pressure forces the piston assembly 260 toward the other outer chamber. This increases the compressive force on this outer chamber, which in turn increases the maximum output pressure of the pump 100.

Beneficially, the delay introduced by the orifice 334 and the orifice 344 and the minimum pressures within the outer chamber 120 and the outer chamber 220 cooperate to increase the maximum output pressure of the pump 100. In one embodiment having a similar structure to that of FIG. 11, the area $A_{P1O}$ and the area $A_{P2O}$ are both equal to 3.14 in$^2$, and the area $A_{P1I}$ and the area $A_{P2I}$ are both equal to 2.7 in$^2$. The outer chamber 120 and outer chamber 220 both have a minimum pressure of 450 psi. The system pressure is 3250 psi, and the shift pressure is 3100 psi.

In this embodiment, the additional force contributed by the minimum pressure is approximately 1413 lbf. This additional force is enough to make up for the reduction in force caused by the area of the piston rod 252. In this embodiment, the force imparted on the piston assembly 260 by fluid within one of the inner chambers at the shift pressure is approximately 8370 lbf, whereas the force imparted on the piston assembly 260 by fluid within one of the inner chambers at system pressure is approximately 8774 lbf. Accordingly, by using orifices to introduce a shifting delay, an additional 404 lbf is gained without having to increase the size of the pump 100.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the pump system as shown in the various exemplary embodiments is illustrative only. Additionally, any element disclosed in one embodiment may be incorporated or utilized with any other embodiment disclosed herein. For example, the piston 500 of the exemplary embodiment shown in at least FIG. 19 may be incorporated in the pump 600 of the exemplary embodiment shown in at least FIG. 21. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A pump system comprising:
    a housing defining a first internal volume and a second internal volume;
    a first piston positioned to separate the first internal volume into a first chamber and a second chamber;
    a second piston positioned to separate the second internal volume into a third chamber and a fourth chamber, the second piston coupled to the first piston;
    a first inlet check valve configured to be at least selectively fluidly coupled to a reservoir, the first inlet check valve positioned to permit a first fluid received from the reservoir to enter the first chamber;
    a second inlet check valve configured to be at least selectively fluidly coupled to the reservoir, the second inlet check valve positioned to permit the first fluid received from the reservoir to enter the third chamber;
    a directional control valve (DCV) fluidly coupled to the second chamber and the fourth chamber, the DCV configured to alternately supply a second fluid to the second chamber and the fourth chamber such that the first fluid is forced out of one of the first chamber or the third chamber, the DCV repositionable between (a) a first position where the DCV is configured to fluidly couple the second chamber to a high pressure fluid source and (b) a second position where the DCV is configured to fluidly couple the fourth chamber to the high pressure fluid source; and
    a relief valve fluidly coupled to the second chamber through a sensing line, the relief valve configured to supply the second fluid to the DCV through an orifice in response to a pressure within the sensing line exceeding a shift pressure to move the DCV from the first position to the second position.

2. The pump system of claim 1, further comprises a piston rod extending between the first piston and the second piston such that a movement of the first piston causes an equal movement of the second piston.

3. The pump system of claim 2, wherein the housing includes a divider separating the second chamber from the fourth chamber, and wherein the divider defines a piston rod aperture through which the piston rod extends.

4. The pump system of claim 1, wherein the first inlet check valve is directly fluidly coupled to the first chamber throughout the entire range of motion of the first piston, and wherein the second inlet check valve is directly fluidly coupled to the third chamber throughout the entire range of motion of the second piston.

5. The pump system of claim 1, wherein the DCV is configured to alternately supply the second fluid to the second chamber and the fourth chamber such that the first fluid is forced out of one of the first chamber or the third chamber to a spring.

6. The pump system of claim 1, further comprising:
    a first outlet check valve fluidly coupled to the first chamber, the first outlet check valve configured to prevent the first fluid from passing from a spring into the first chamber; and
    a second outlet check valve fluidly coupled to the third chamber, the second outlet check valve configured to prevent the first fluid from passing from the spring into the third chamber.

7. The pump system of claim 1, wherein the housing defines a first outlet passage fluidly coupled to the first chamber and a second outlet passage fluidly coupled to the third chamber, and wherein the first outlet passage is fluidly coupled to the second outlet passage.

8. The pump system of claim 1, wherein the first fluid is a gas.

9. The pump system of claim 1, wherein the second fluid is a liquid.

10. The pump system of claim 1, wherein the first piston and the second piston are configured to translate along an actuation axis, and wherein the first piston and the second piston are centered about the actuation axis.

11. The pump system of claim 1, wherein the second chamber and the fourth chamber are positioned between the first chamber and the third chamber.

12. A pump system comprising:
    a housing defining a first internal volume and a second internal volume;
    a first piston positioned to separate the first internal volume into a first chamber and a second chamber;
    a second piston positioned to separate the second internal volume into a third chamber and a fourth chamber, wherein the first chamber and the third chamber are configured to selectively receive a first fluid from a first fluid source, and wherein the second chamber and the fourth chamber are configured to selectively receive a second fluid from a second fluid source;
    a directional control valve (DCV) fluidly coupled to the second chamber and the fourth chamber, the DCV repositionable between (a) a first position where the DCV is configured to fluidly couple the second chamber to the second fluid source and (b) a second position where the DCV is configured to fluidly couple the fourth chamber to the second fluid source; and a relief valve fluidly coupled to the second chamber through a sensing line, the relief valve configured to supply the second fluid to the DCV through an orifice in response to a pressure within the sensing line exceeding a shift pressure to move the DCV from the first position to the second position.

13. The pump system of claim 12, wherein the relief valve is a first relief valve, the sensing line is a first sensing line, the pressure is a first pressure, and the shift pressure is a first shift pressure, further comprising a second relief valve fluidly coupled to the fourth chamber through a second sensing line, wherein the second relief valve is configured to supply the second fluid to the DCV in response to a second pressure within the second sensing line exceeding a second shift pressure to move the DCV from the second position to the first position.

14. The pump system of claim 12, wherein the first fluid source is a gas spring or a gas reservoir, and wherein the second fluid source is a hydraulic pump.

15. The pump system of claim 12, wherein the orifice is positioned between the sensing line and the second chamber.

16. The pump system of claim 15, wherein the orifice is positioned to cause a delay in a flow of the second fluid reaching the relief valve.

17. A pump system comprising:
   a housing defining a first internal volume and a second internal volume;
   a first piston positioned to separate the first internal volume into a first chamber and a second chamber;
   a second piston positioned to separate the second internal volume into a third chamber and a fourth chamber;
   a directional control valve (DCV) fluidly coupled to the second chamber and the fourth chamber;
   a first relief valve fluidly coupled to the DCV via a first control line and the second chamber via a first sensing line;
   a first orifice positioned along the first sensing line;
   a second relief valve fluidly coupled to the DCV via a second control line and the fourth chamber via a second sensing line; and
   a second orifice positioned along the second sensing line; wherein the DCV is repositionable between (a) a first position where a fluid flows to the DCV from the fourth chamber and (b) a second position where the fluid flows to the DCV from the second chamber; and wherein the first relief valve is configured to move the DCV from the first position to the second position in response to a pressure within the first sensing line exceeding a shift pressure.

18. The pump system of claim 17, wherein the first orifice and the second orifice are positioned to cause a delay in a flow of a fluid reaching the first relief valve and the second relief valve, respectively.

19. The pump system of claim 17, wherein the DCV is configured to fluidly couple to a fluid pump and a fluid tank, and wherein, when the DCV is in the first position, the fluid flows (a) from the fourth chamber to the DCV and to the fluid tank and (b) from the fluid pump to the DCV to the second chamber.

* * * * *